US012604262B2

(12) United States Patent　(10) Patent No.:　US 12,604,262 B2
Akl et al.　(45) Date of Patent:　Apr. 14, 2026

(54) CELL ACTIVATION BASED ON RECEIVED INDICATION

(71) Applicant: QUALCOMM Incorporated, San Diego, CA (US)

(72) Inventors: Naeem Akl, Bridgewater, NJ (US); Navid Abedini, Basking Ridge, NJ (US); Karl Georg Hampel, Jersey City, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 17/990,606

(22) Filed: Nov. 18, 2022

(65) Prior Publication Data

US 2024/0172108 A1　May 23, 2024

(51) Int. Cl.
| | |
|---|---|
| *H04W 48/20* | (2009.01) |
| *H04B 17/309* | (2015.01) |
| *H04W 48/08* | (2009.01) |
| *H04W 74/0833* | (2024.01) |

(52) U.S. Cl.
CPC .......... *H04W 48/20* (2013.01); *H04B 17/309* (2015.01); *H04W 48/08* (2013.01); *H04W 74/0833* (2013.01)

(58) Field of Classification Search
CPC . H04W 48/20; H04W 48/08; H04W 74/0833; H04W 88/085; H04W 48/16; H04B 17/309
See application file for complete search history.

(56) References Cited

U.S. PATENT DOCUMENTS

| | | | | |
|---|---|---|---|---|
| 2023/0344567 | A1* | 10/2023 | Turner | ................. H04W 16/32 |
| 2024/0334270 | A1* | 10/2024 | Zhang | ............ H04W 36/00835 |
| 2025/0097985 | A1* | 3/2025 | Belleschi | ............. H04W 24/02 |
| 2025/0227579 | A1* | 7/2025 | Orsino | ................. H04W 36/08 |

FOREIGN PATENT DOCUMENTS

WO　WO-2024072308 A1 *　4/2024　........ H04W 56/0045

OTHER PUBLICATIONS

International Search Report and Written Opinion—PCT/US2023/076884—ISA/EPO—Dec. 20, 2023.
Qualcomm Incorporated: "Information Exchange over Network Interfaces for Network Energy Savings", 3GPP TSG-RAN WG3 Meeting #118-e, R3-226525, 3rd Generation Partnership Project, Mobile Competence Centre, 650, Route Des Lucioles, F-06921 Sophia-Antipolis Cedex, France, vol. 3GPP RAN 3, No. Toulouse, FR, Nov. 14, 2022-Nov. 18, 2022, Nov. 4, 2022, 6 Pages, XP052224009, the Whole Document.

(Continued)

*Primary Examiner* — Austin J Moreau
(74) *Attorney, Agent, or Firm* — Loza & Loza, LLP

(57)　ABSTRACT

Aspects relate to cell activation. A first apparatus (e.g., a distributed unit) may obtain a first indication that is indicative of whether a user equipment is present within a coverage of a cell served by the first apparatus. The first apparatus may then output a second indication based on the first indication to a second apparatus (e.g., a central unit). In some aspects, the outputting of the second indication may be based on the first indication indicating that the user equipment is present within the coverage of the cell.

27 Claims, 18 Drawing Sheets

(56)     References Cited

OTHER PUBLICATIONS

Qualcomm Incorporated: "Network Energy Saving", 3GPP TSG-RAN WG3 #114-bis-e, R3-220265, 3rd Generation Partnership Project, Mobile Competence Centre, 650, Route Des Lucioles, F-06921 Sophia-Antipolis Cedex, France, vol. RAN WG3, No. Online, Jan. 17, 2022-Jan. 26, 2022, Jan. 7, 2022, 6 Pages, XP052098863, the Whole Document.

ZTE: "Discussion on Mobility Enhancement for Mobile IAB", 3GPP TSG-RAN WG2 Meeting #119bis electronic, R2-2209616, 3rd Generation Partnership Project, Mobile Competence Centre, 650, Route Des Lucioles, F-06921 Sophia-Antipolis Cedex, France, vol. RAN WG2, No. electronic, Oct. 10, 2022-Oct. 19, 2022, Sep. 30, 2022, 9 Pages, XP052262945, pp. 2-8, 2. Discussion.

* cited by examiner

100

104 RAN

108 Scheduling Entity (e.g., Base Station)

Downlink Traffic 112

Downlink Control 114

Uplink Traffic 116

Uplink Control 118

106 Scheduled Entity (e.g., UE)

120 Backhaul

102 Core Network (e.g., 5GC)

110 External Data Network (e.g., Internet)

600
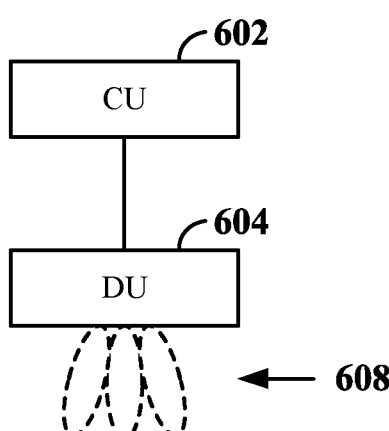
608
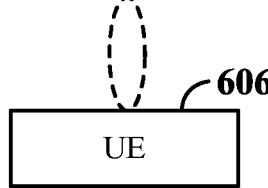
FIG. 6

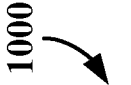
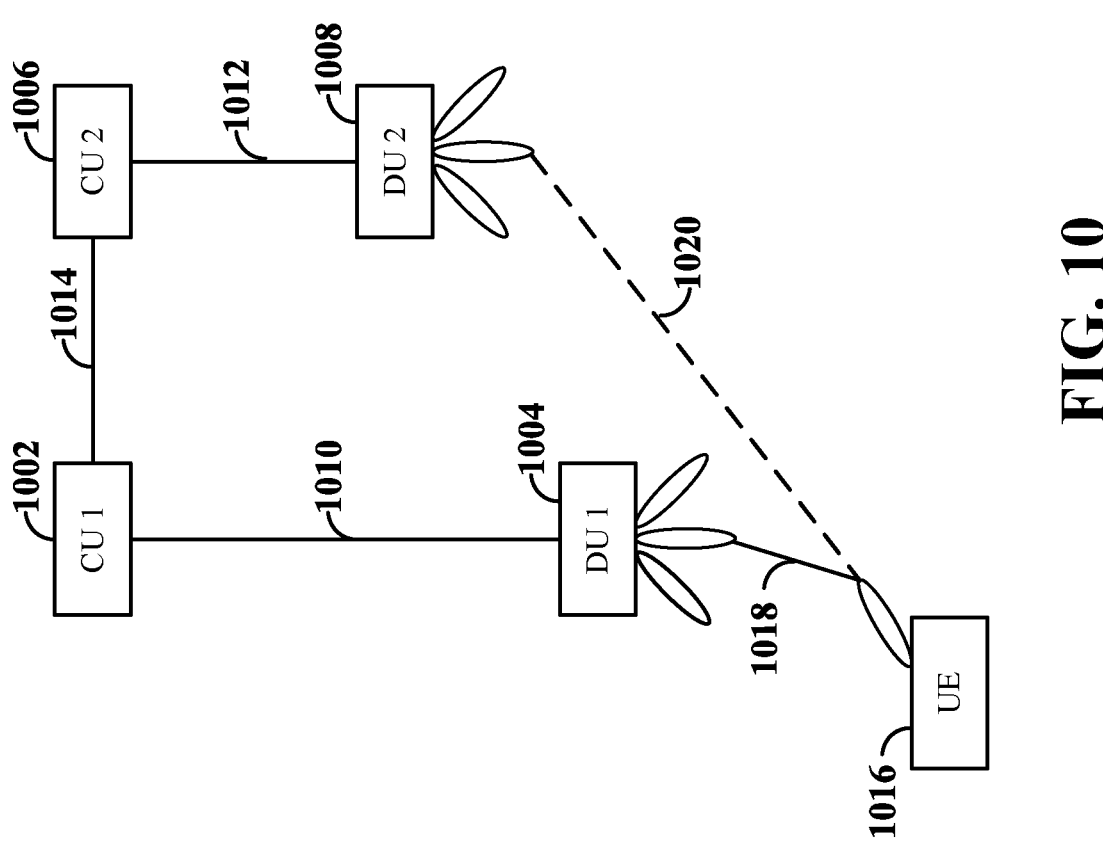
FIG. 10

1100

1104 CU

1102 DU

1106 UE

1108 Neighbor Cell

Optional cell activation information 1110

UE transmission 1112

DL transmission 1114

OTA signaling 1116

1118 Identify presence of UE

Cell activation indication 1120

Cell activation response 1122

1200

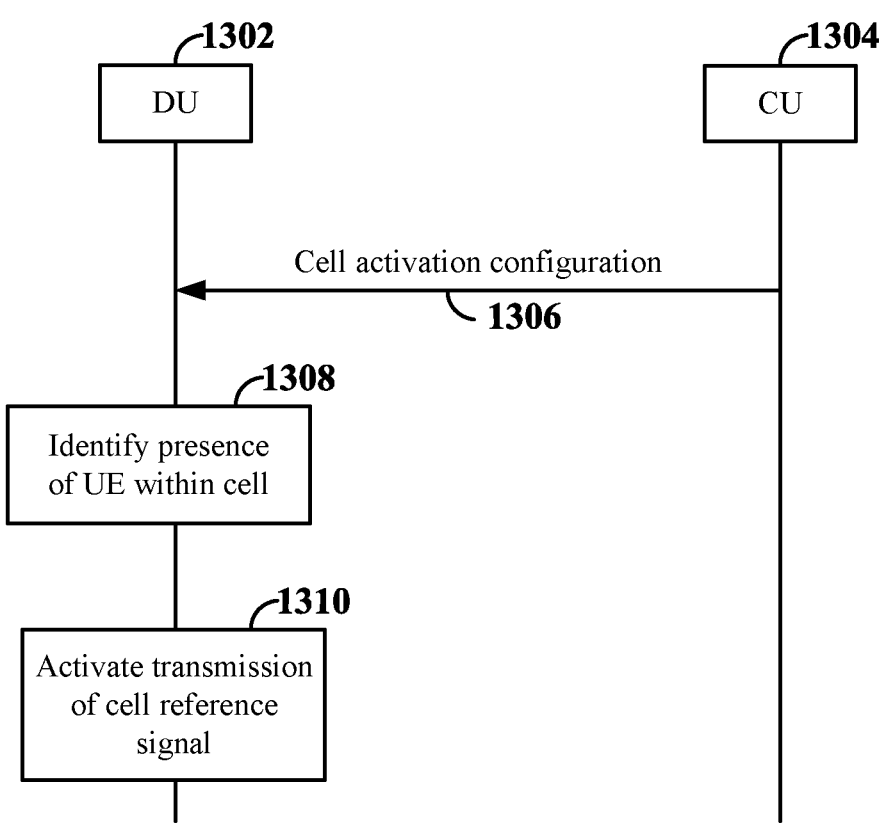
FIG. 13

1400

Start

Receive a first indication of whether a UE is present within the coverage of a cell served by the DU                    1402

Transmit a second indication of activation of the cell based on the first indication indicating that the UE is present                    1404

End

1600

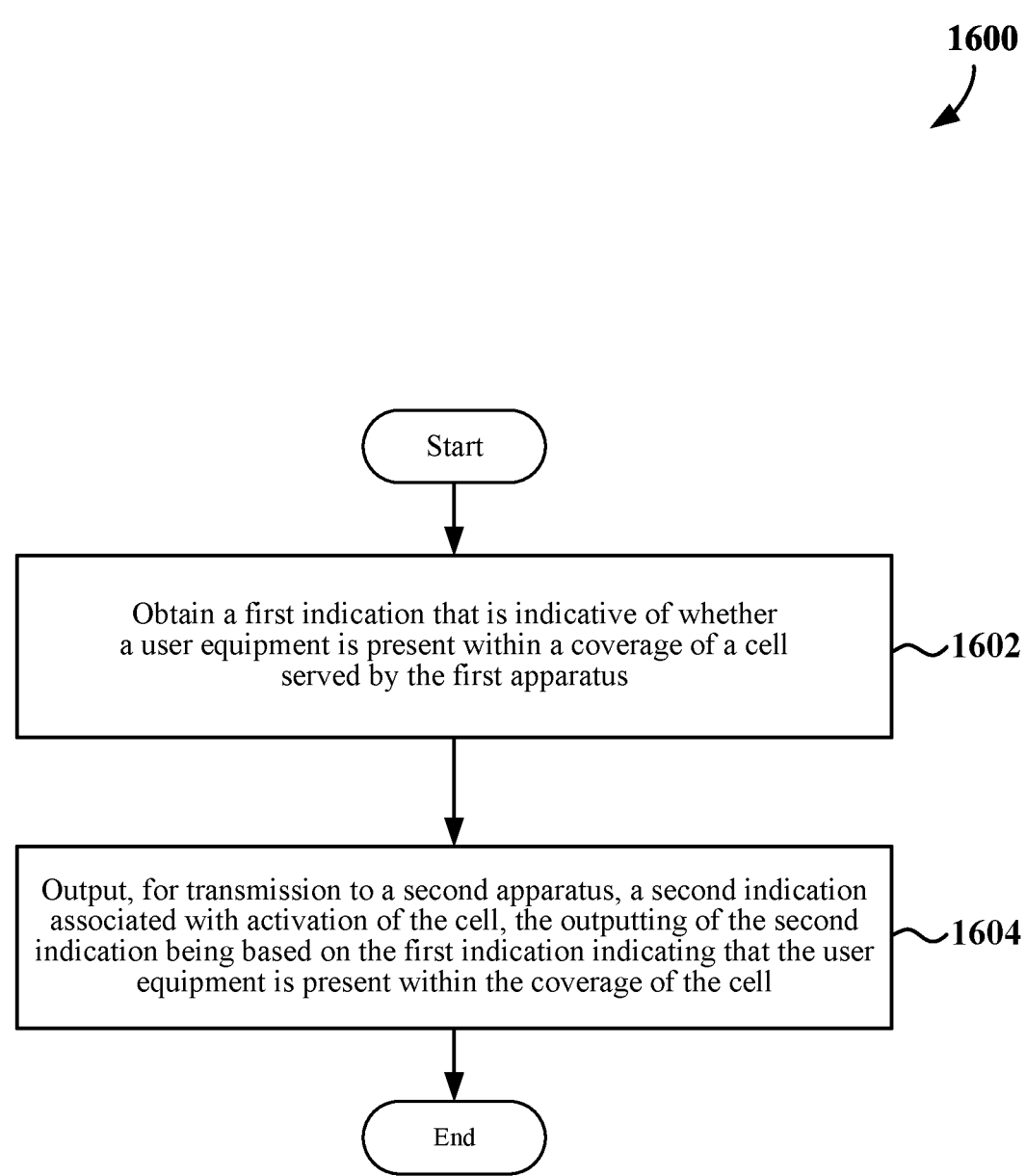

Start

Obtain a first indication that is indicative of whether
a user equipment is present within a coverage of a cell
served by the first apparatus                                    1602

Output, for transmission to a second apparatus, a second indication
associated with activation of the cell, the outputting of the second
indication being based on the first indication indicating that the user
equipment is present within the coverage of the cell             1604

End

FIG. 16

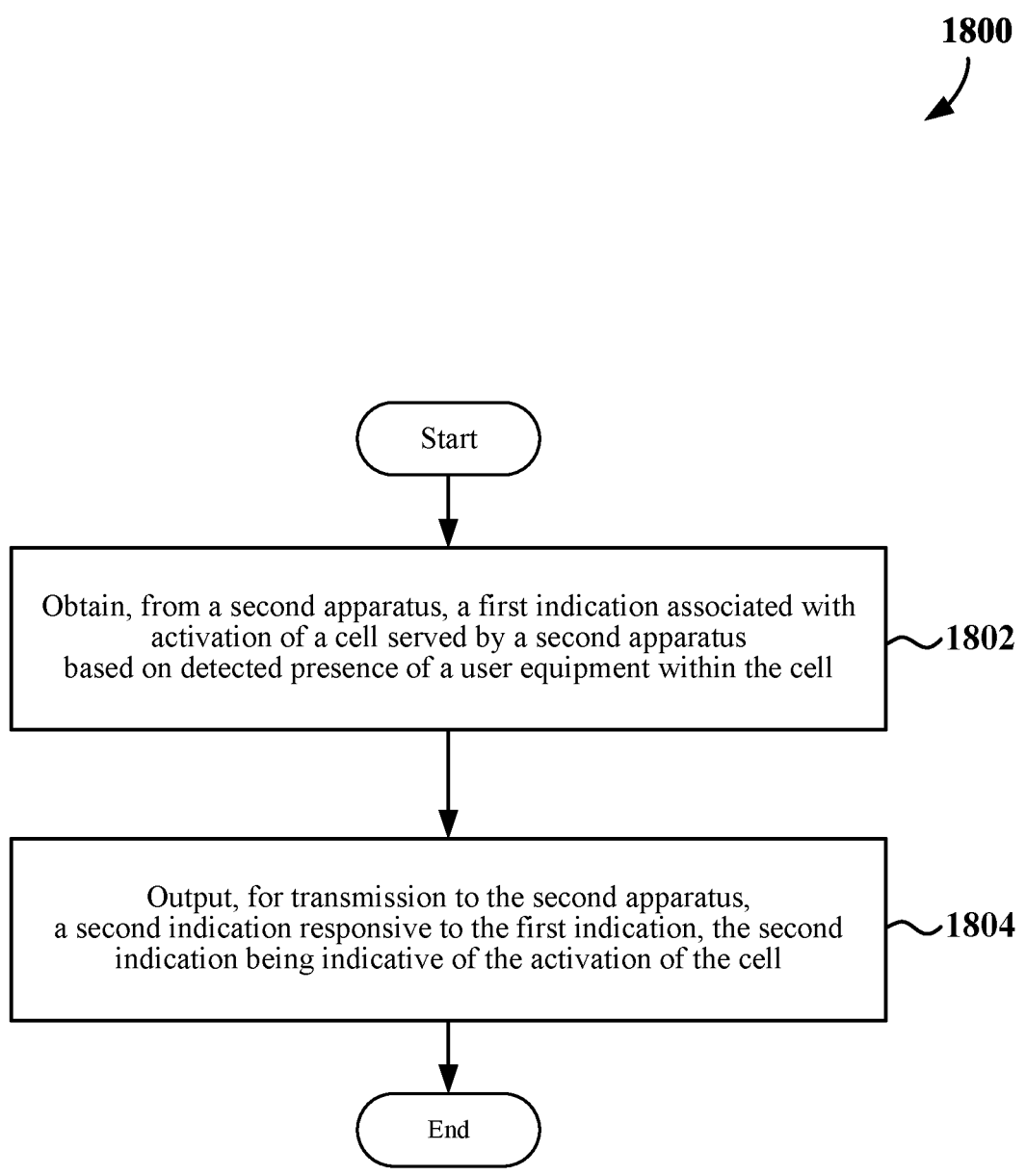

1800

Start

Obtain, from a second apparatus, a first indication associated with
activation of a cell served by a second apparatus
based on detected presence of a user equipment within the cell    1802

Output, for transmission to the second apparatus,
a second indication responsive to the first indication, the second
indication being indicative of the activation of the cell    1804

End

FIG. 18

CELL ACTIVATION BASED ON RECEIVED INDICATION

TECHNICAL FIELD

The technology discussed below relates generally to wireless communication and, more particularly, to activating a wireless communication cell based on a received indication.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) to be used by different UEs operating within the cell. Thus, each UE may transmit information to the base station via one or more of these resources and/or the base station may transmit information to one or more of the UEs via one or more of these resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus for communication may include a processing system. The processing system may be configured to obtain a first indication that is indicative of whether a user equipment is present within a coverage of a cell served by the first apparatus. The processing system may also be configured to output, for transmission to a second apparatus, a second indication associated with activation of the cell, the outputting of the second indication being based on the first indication indicating that the user equipment is present within the coverage of the cell.

In some examples, a method for communication at a first apparatus is disclosed. The method may include obtaining a first indication that is indicative of whether a user equipment is present within a coverage of a cell served by the first apparatus. The method may also include outputting, for transmission to a second apparatus, a second indication associated with activation of the cell, the outputting of the second indication being based on the first indication indicating that the user equipment is present within the coverage of the cell.

In some examples, a first apparatus for communication may include means for obtaining a first indication that is indicative of whether a user equipment is present within a coverage of a cell served by the first apparatus. The first apparatus may also include means for outputting, for transmission to a second apparatus, a second indication associated with activation of the cell, the outputting of the second indication being based on the first indication indicating that the user equipment is present within the coverage of the cell.

In some examples, a non-transitory computer-readable medium has stored therein instructions executable by a processing system of a first apparatus to obtain a first indication that is indicative of whether a user equipment is present within a coverage of a cell served by the first apparatus. The computer-readable medium may also have stored therein instructions executable by the processing system of the first apparatus to output, for transmission to a second apparatus, a second indication associated with activation of the cell, the outputting of the second indication being based on the first indication indicating that the user equipment is present within the coverage of the cell.

In some examples, a network entity for communication may include a transceiver and a processing system. The transceiver may be configured to receive a first indication that is indicative of whether a user equipment is present within a coverage of a cell served by the network entity. The processing system may be configured to output a second indication associated with activation of the cell, the outputting of the second indication being based on the first indication indicating that the user equipment is present within the coverage of the cell. The transceiver may also be configured to transmit the second indication.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 6 is a schematic illustration of a wireless communication system according to some aspects.

FIG. 10 is a schematic illustration of a wireless communication system according to some aspects.

FIG. 13 is a signaling diagram illustrating an example of cell activation-related signaling according to some aspects.

FIG. 16 is a flow chart illustrating an example communication method involving cell activation according to some aspects.

FIG. 18 is a flow chart illustrating an example communication method involving cell activation according to some aspects.

DETAILED DESCRIPTION

Figure 1:
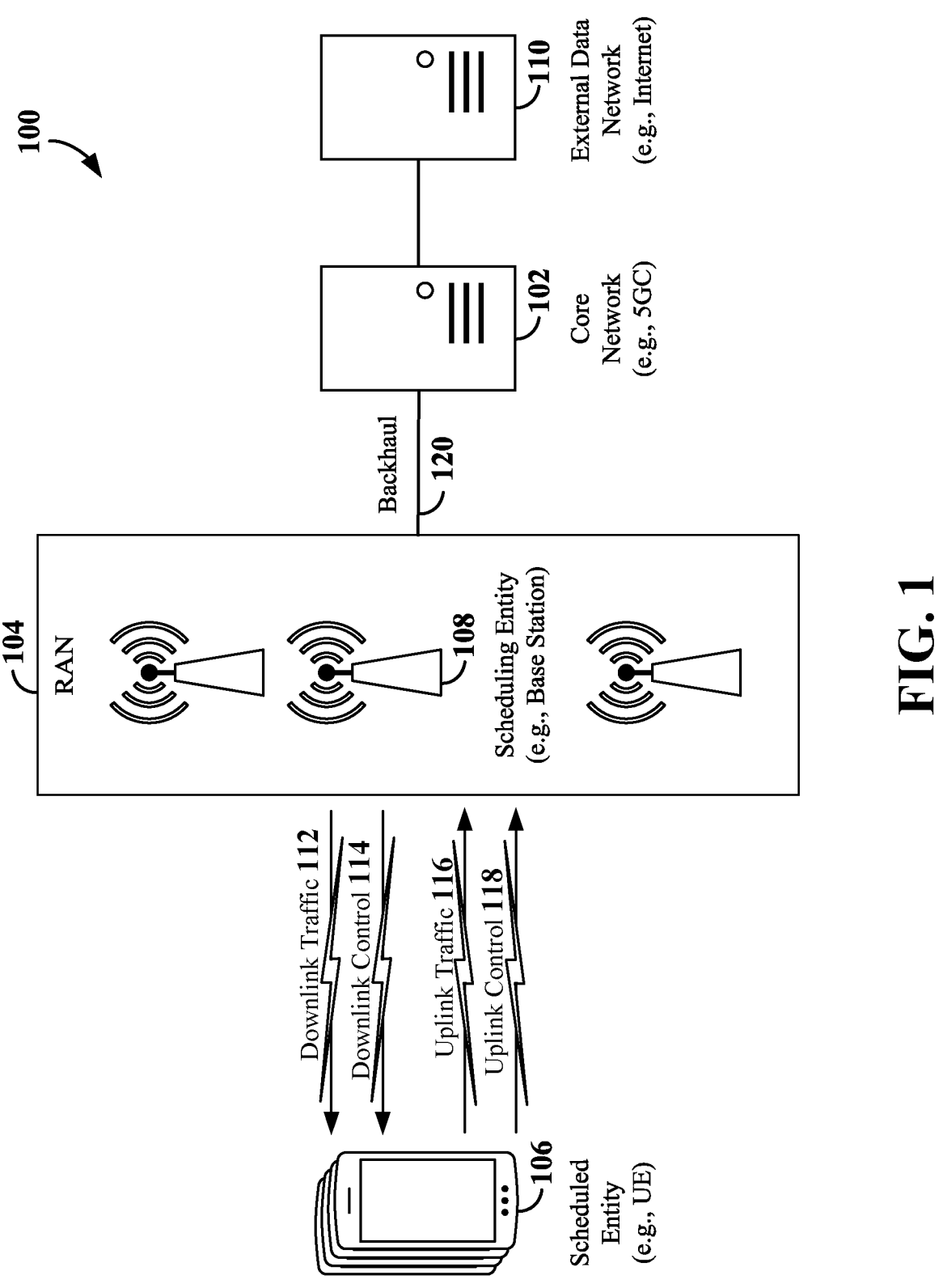
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to cell activation. A distributed unit that schedules one or more cells in a wireless communication network may obtain a first indication that a user equipment that does not have a connection with the distributed unit is within a coverage (e.g., a coverage area) of a first cell of the distributed unit. The distributed unit may then output a second indication based on the first indication to a central unit for the first distributed unit in conjunction with activation of the first cell.

In some examples, the distributed unit may determine whether to activate the first cell in response to a determination that the user equipment is within or near the coverage of the first cell. In this case, the distributed unit may send a message to the central unit indicating that the distributed unit activated the first cell.

In some examples, in response to a determination that the user equipment is within or near the coverage of the first cell, the distributed unit may send a message to the central unit requesting activation of the first cell. In this case, the central unit may send a response to the distributed unit indicating whether the first cell is to be activated.

In some examples, the central unit may activate the first cell prior to detection of the presence of the user equipment within the first cell. Here, the activation of the first cell does not result in transmissions of a reference signal by the first cell. In this case, in response to a subsequent determination that the user equipment is within or near the coverage of the first cell, the distributed unit may activate the transmissions of the reference signal by the first cell.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), a vehicle (e.g., an automobile, a bus, etc.) and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
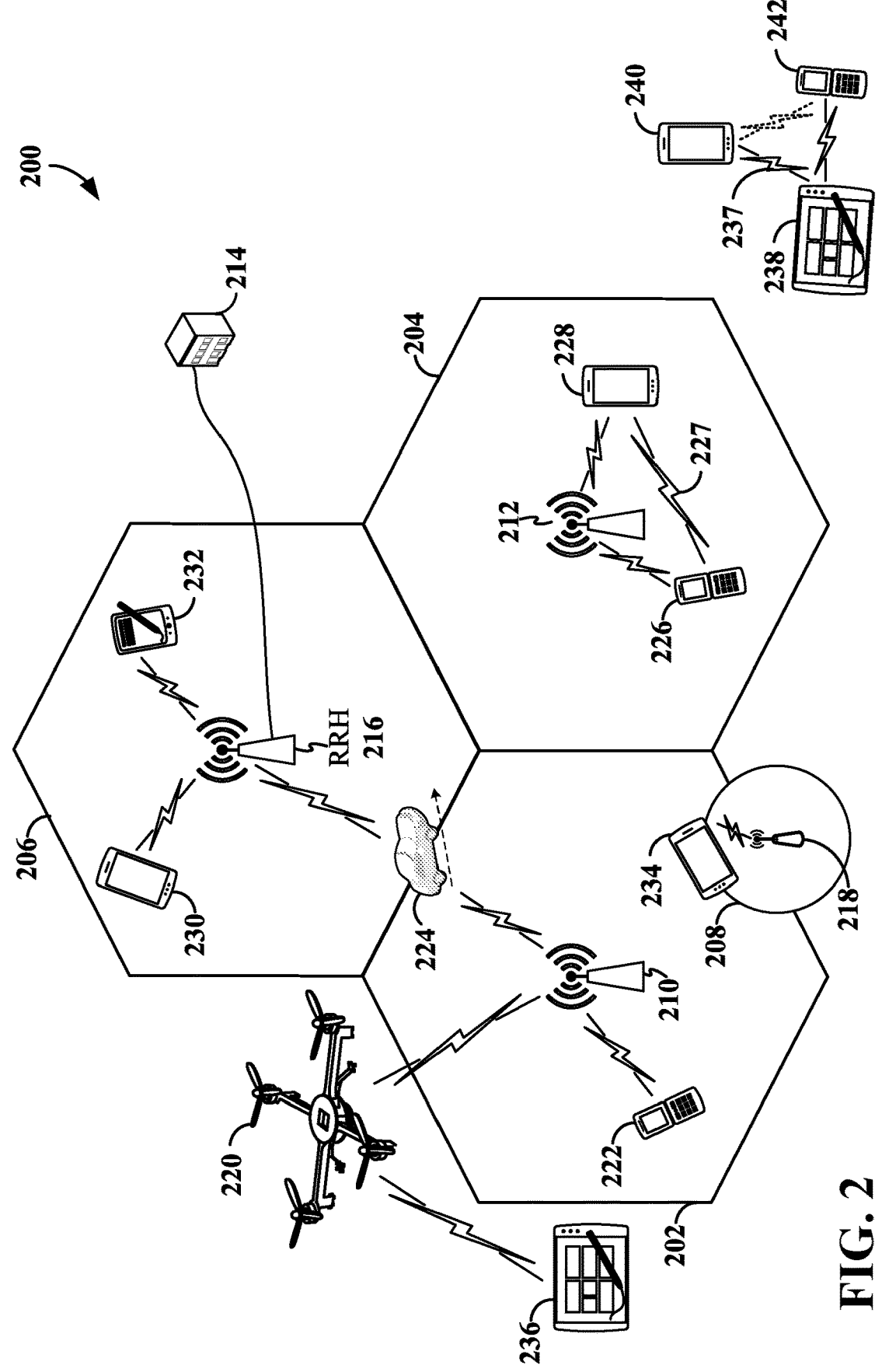
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
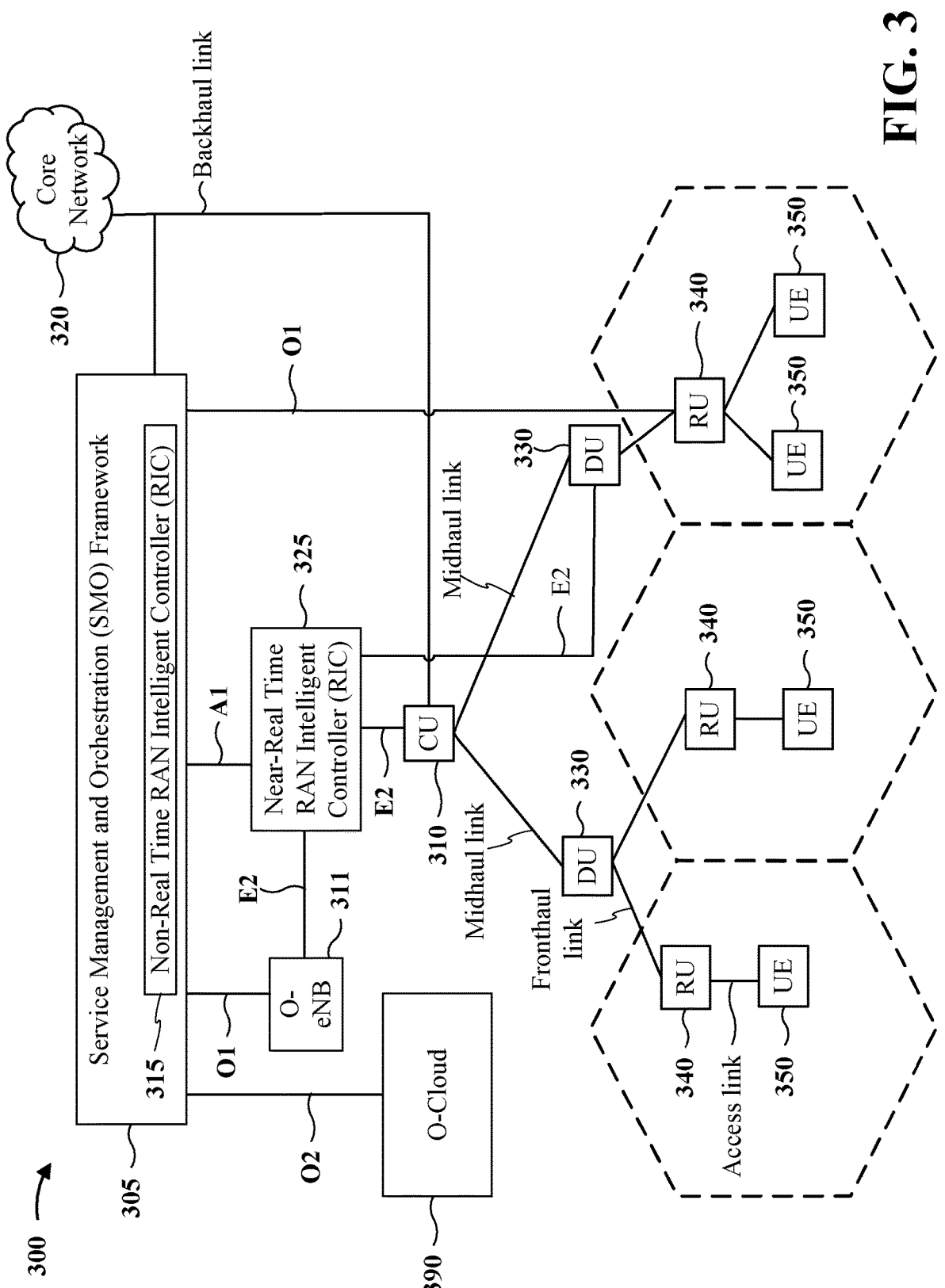
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
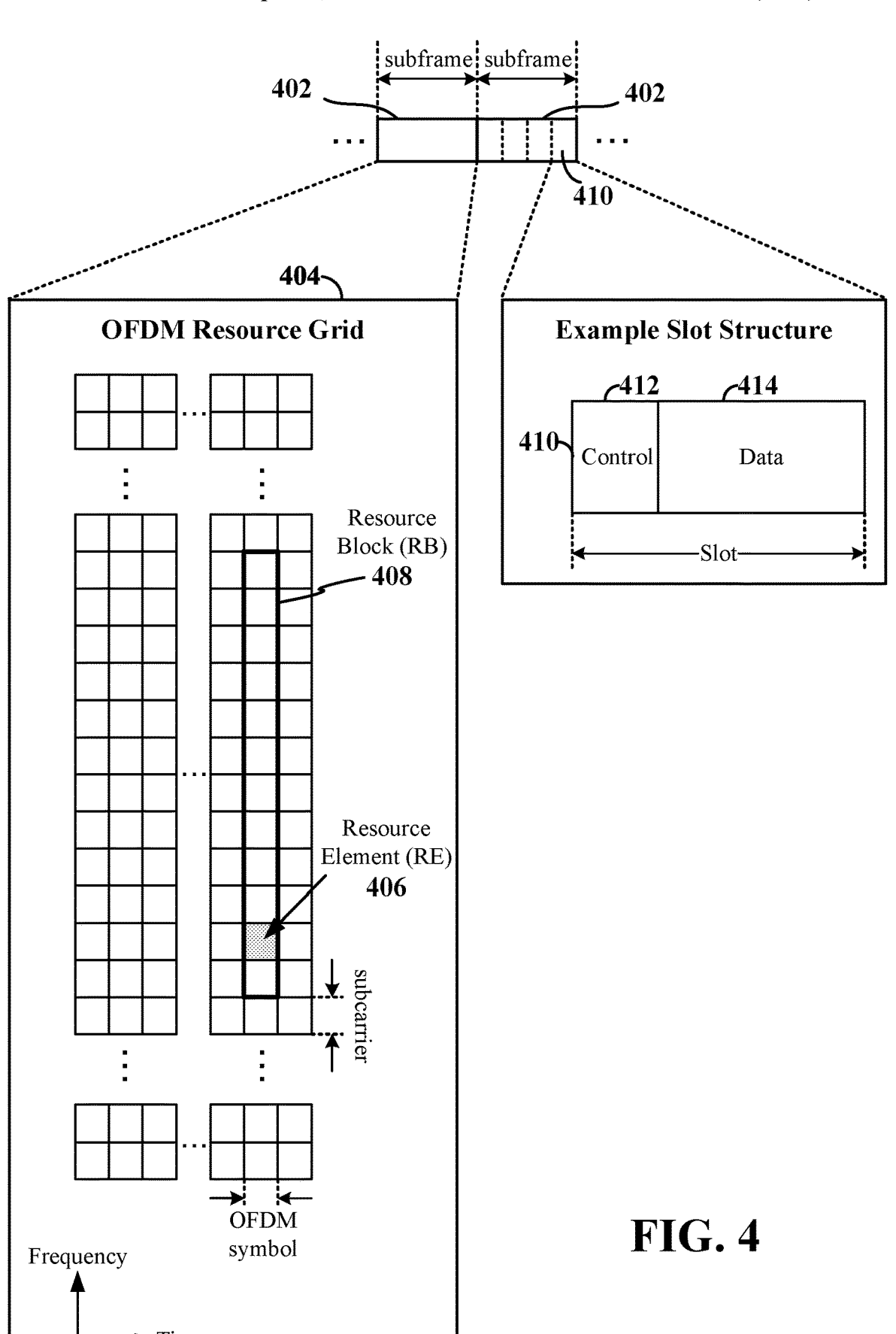
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
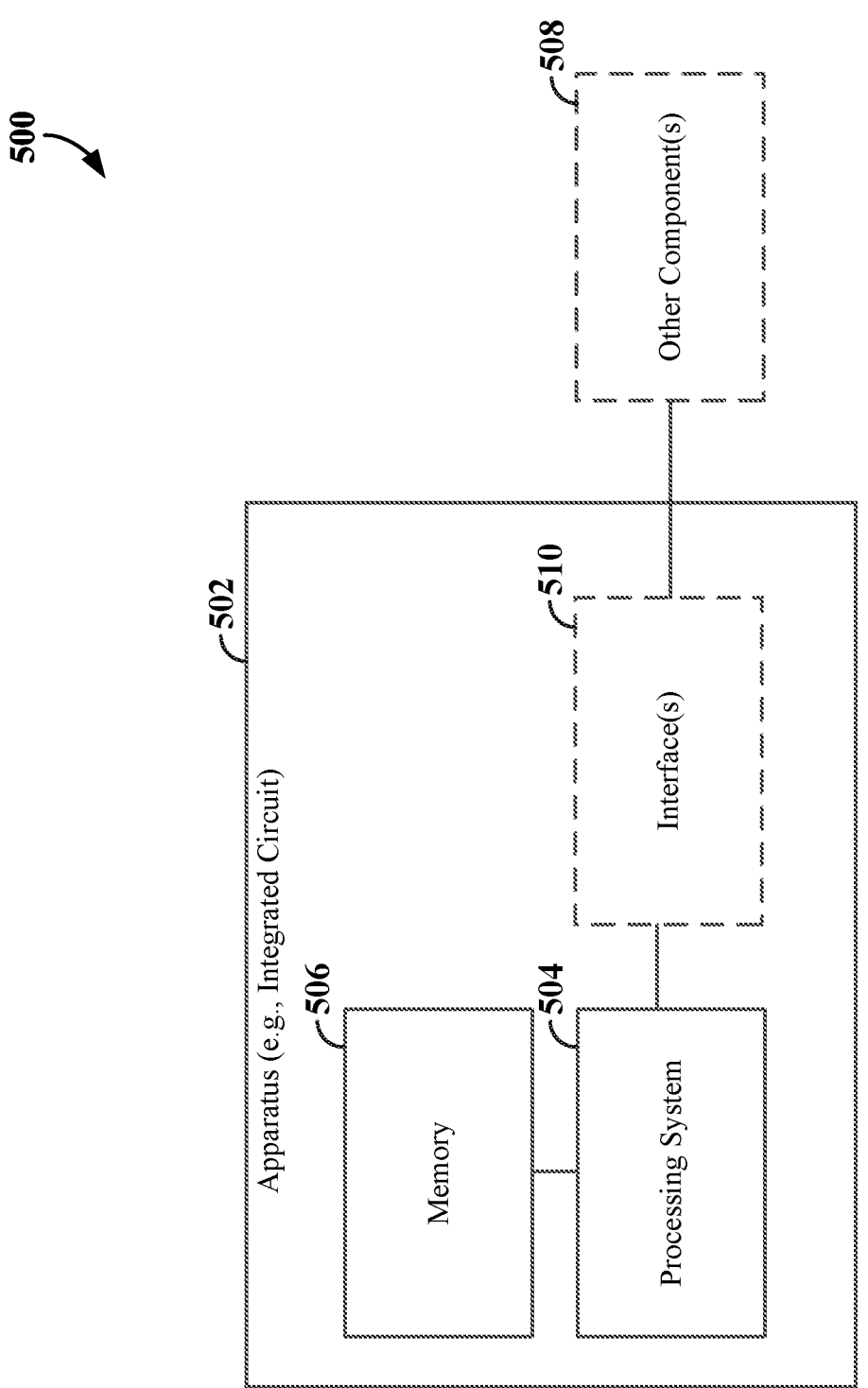
FIG. 5 is a schematic illustration of an example of an apparatus for communication according to some aspects.

FIG. 5 illustrates an example apparatus 500 according to certain aspects of the disclosure. In some examples, the apparatus 500 may be a BS, a UE, or some other type of wireless node (e.g., a node that utilizes wireless spectrum (e.g., the RF spectrum) to communicate with another node or entity). In some examples, the apparatus 500 may correspond to any of the apparatuses, UEs, scheduled entities, network entities, base stations (e.g., gNBs), scheduling entities, DUs, CUs, RAN nodes, or CN entities shown in any of FIGS. 1-3, 6, 8-13, 15, and 17.

The apparatus 500 includes an apparatus 502 (e.g., an integrated circuit) and, optionally, at least one other component 508. In some aspects, the apparatus 502 may be configured to operate in a wireless communication device (e.g., a UE, a BS, etc.) and to perform one or more of the operations described herein. The apparatus 502 includes a processing system 504, and a memory 506 coupled to the processing system 504. Example implementations of the processing system 504 are provided herein. In some examples, the processing system 504 of FIG. 5 may correspond to the processing system 1514 of FIG. 15. In some examples, the processing system 504 of FIG. 5 may correspond to the processing system 1714 of FIG. 17.

The processing system 504 is generally adapted for processing, including the execution of such programming stored on the memory 506. For example, the memory 506 may store instructions that, when executed by the processing system 504, cause the processing system 504 to perform one or more of the operations described herein.

In some implementations, the apparatus 502 communicates with at least one other component (e.g., a component 508 external to the apparatus 502) of the apparatus 500. To this end, in some implementations, the apparatus 502 may include at least one interface 510 (e.g., a send and/or receive interface) coupled to the processing system 504 for outputting and/or obtaining (e.g., sending and/or receiving) information (e.g., received information, generated information, decoded information, messages, etc.) between the processing system 504 and the other component(s) 508. In some implementations, the interface 510 may include an interface bus, bus drivers, bus receivers, buffers, other suitable circuitry, or a combination thereof. In some implementations, the interface 510 may include radio frequency (RF) circuitry (e.g., an RF transmitter and/or an RF receiver). In some implementations, the interface 510 may be configured to interface the apparatus 502 to one or more other components of the apparatus 500 (other components not shown in FIG. 5). For example, the interface 510 may be configured to interface the processing system 504 to a radio frequency (RF) front end (e.g., an RF transmitter and/or an RF receiver).

The apparatus 502 may communicate with other apparatuses in various ways. In cases where the apparatus 502 includes an RF transceiver (not shown in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface, to an RF front end for RF transmission. Similarly, rather than receiving information via RF signaling, the apparatus 502 may have an interface to obtain information that is received by another apparatus. For example, the processing system 504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

FIG. 6 illustrates an example of a wireless communication system 600 that includes a CU 602 (e.g., a central unit, which may also be referred to as a control unit), a DU 604, and a user equipment 606. In some examples, the CU 602 may correspond to any of the CUs, base stations, or scheduling entities shown in any of FIGS. 1-3, 5, 8-13, and 17. In some examples, the DU 604 may correspond to any of the DUs, base stations, or scheduling entities shown in any of FIGS. 1-3, 5, and 8-13, and 15. In some examples, the user equipment 606 may correspond to any of the UEs, or scheduled entities shown in any of FIGS. 1-3, 5, and 8-11.

As discussed above, the CU 602 may control one or more DUs (e.g., the DU 604), where each DU may serve one or more cells. In the example of FIG. 6, the DU 604 (e.g., with associated radio units) provides service via one or more cells (e.g., corresponding to beams 608) that may be accessed by nearby UEs such as the UE 606. For example, the UE 606 may connect to a base station on one or more of these cells.

In various scenarios, the network (e.g., the core network) may elect to activate or deactivate a cell served by the DU 604. For example, in the event a primary cell that is serving the user equipment 606 does not provide the level of bandwidth, throughput, or latency required by the user equipment 606 (e.g., required by a high performance application running on the user equipment 606), the network may elect to activate a secondary cell for the user equipment 606 (e.g., for a carrier aggregation scenario). Subsequently, in the event the user equipment 606 no longer needs the secondary cell (e.g., a high performance application on the user equipment 606 is no longer being used), the network may elect to deactivate this secondary cell for the user equipment.

Activation and deactivation of a cell may occur with respect to a UE and/or with respect to the network. For example, as discussed above, a cell may be activated or deactivated with respect to providing service for a particular UE. In such a case, the cell may still remain active with respect to providing service for some other UE.

In contrast, in some scenarios, a cell may be entirely deactivated (e.g., no UEs can access the cell). For example, a CU may elect to deactivate a cell of a DU to conserve power at the DU (e.g., in the event the cell is not currently providing service for any UEs, in the event the cell is rarely used, etc.). In this case, the base station will not be transmitting any signaling for broadcast via that cell.

Figure 7:
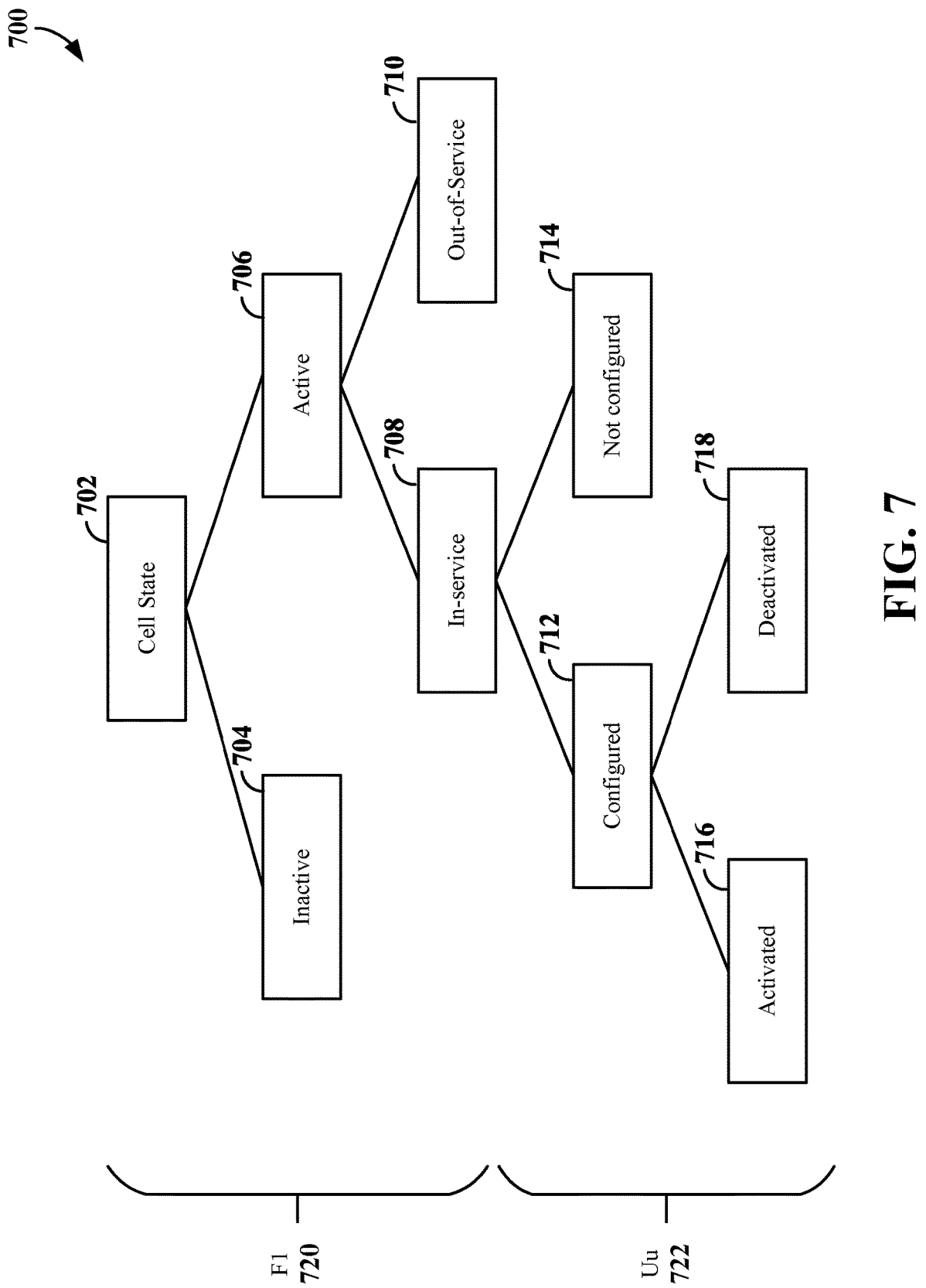
FIG. 7 is a schematic illustration of an example of cell states according to some aspects.

FIG. 7 illustrates an example of various cell states 700 that may occur in a network. From the perspective of the network (e.g., a CU), a cell state 702 may be inactive 704 or active 706. In the event the cell is active 706, the cell may be in-service 708 or out-of-service 710 (e.g., temporarily out-of-service) from the perspective of the network depending on whether the activation succeeded or failed, respectively.

In the event a cell is in-service 708, the cell may be configured 712 or not configured 714 from the perspective of a UE. If the cell is configured 712 for the UE, the cell may be activated 716 or deactivated 718 for that UE.

As shown in FIG. 7, F1 signaling (e.g., F1 application protocol (F1-AP) signaling) may use used by a CU and a DU to communicate information relating to whether a cell is inactive 704, active 706, in-service 708, or out-of-service 710 with respect to the network. Conversely, Uu signaling may be used by a DU and a UE to communicate information relating to whether a cell is configured 712, not configured 714, activated 716, or deactivated 718 with respect to that UE. In some examples, F1 signaling involves an F1 application protocol over a stream control transmission protocol (SCTP) over an IPsec protocol. In some examples, Uu signaling involves an RRC protocol over a packet data convergence protocol (PDCP) over a radio link control (RLC) protocol. In some examples, Uu signaling involves the RRC protocol over a medium access control (MAC) protocol over a PHY layer protocol.

Figure 8:
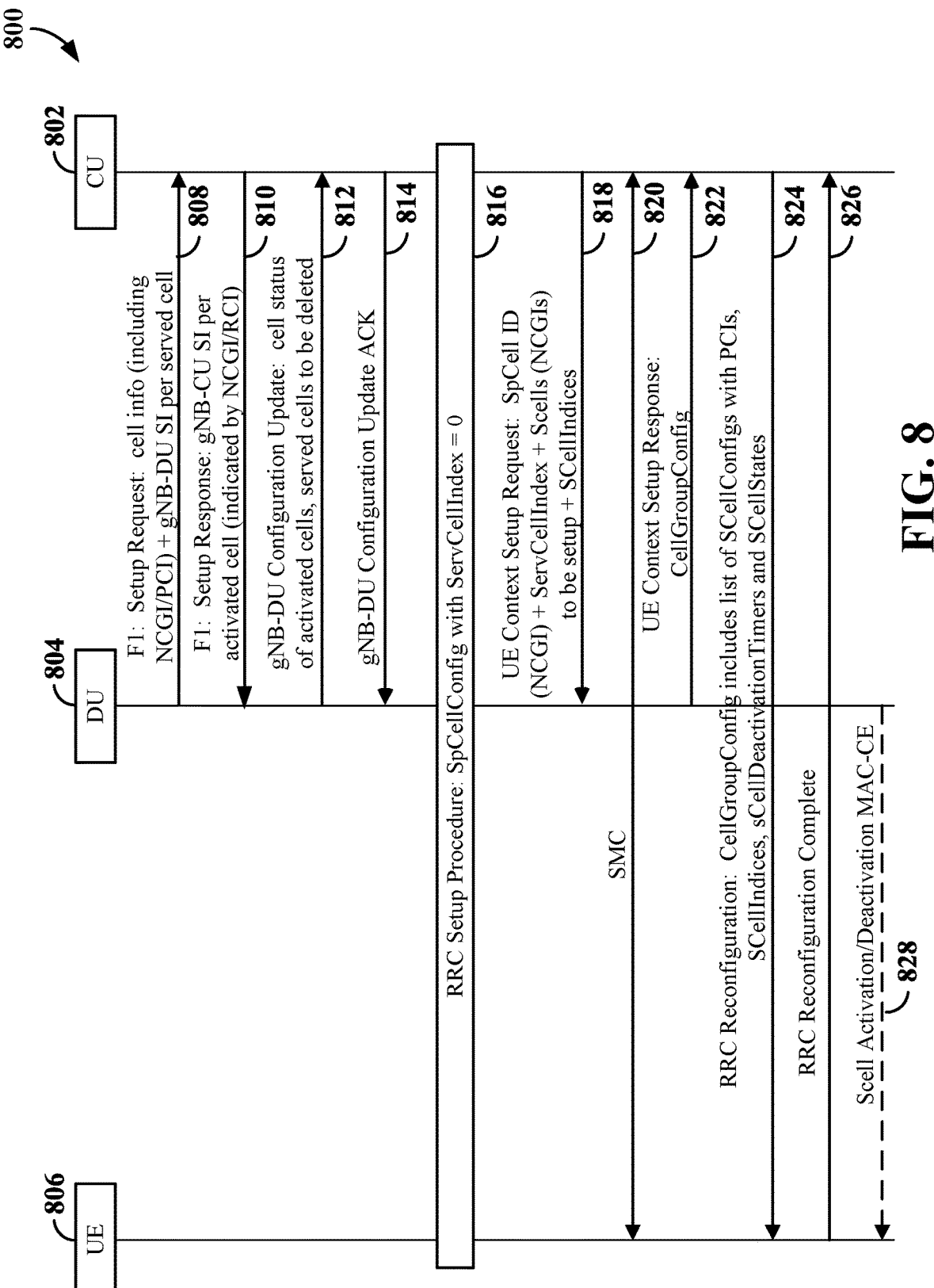
FIG. 8 is a signaling diagram illustrating an example of cell activation and deactivation-related signaling according to some aspects.

FIG. 8 is a signaling diagram 800 illustrating an example of cell activation and deactivation in a wireless communication system including a CU 802, a DU 804, and a user equipment 806. In some examples, the CU 802 may correspond to any of the CUs, base stations, or scheduling entities shown in any of FIGS. 1-3, 5, 6, 9-13, and 17. In some examples, the DU 804 may correspond to any of the DUs, base stations, or scheduling entities shown in any of FIGS. 1-3, 5, 6, 9-13, and 15. In some examples, the user equipment 806 may correspond to any of the UEs, or scheduled entities shown in any of FIGS. 1-3, 5, 6, and 9-11.

At #808 of FIG. 8, the DU 804 sends a setup request message to the CU 802. In some examples, this message includes information about the cells of the DU 804. For example, the DU 804 may be configured to use certain frequency bands.

At #810, the CU 802 sends a setup response message to the DU 804. In some examples, this message indicates which cells are to be activated (and, optionally, which cells are to be deactivated).

At #812, after attempting to activate the cells specified by the message of #810, the DU 804 sends a configuration update message to the CU 802. In some examples, this message indicates which cells were successfully activated and/or which cells were not. In some examples, this message indicates which cells are in-service and/or which cells are out-of-service.

At #814, the CU 802 sends an acknowledgement message in response to the message of #812.

At this point, one or more cells are now ready to serve the UEs under the DU (e.g., the UE 806). Here, each UE may be configured with a different subset of the cells. For example, in some cases, a given cell may be configured for one UE but not another UE.

In some examples (e.g., a carrier aggregation scenario, a dual connectivity (DC) scenario, etc.), a UE may be served by a primary cell and at least one secondary cell (e.g., that may provide additional throughput, etc., for the UE). From the perspective of a UE, a secondary cell does not need to be active all of the time. Thus, from the perspective of a UE, a secondary cell may be activated at some point in time, subsequently deactivated, subsequently reactivated, and so on.

At #816, the CU 802 performs an RRC setup procedure with the user equipment 806. In some examples, this procedure configures the cells that were confirmed at #814.

At #818, the CU 802 sends a UE context setup request message to the DU 804. In some examples, this message identifies one or more secondary cells (e.g., an SpCell) to be setup for the user equipment 806. Accordingly, at 820, the CU 802 performs a security mode command (SMC) procedure with the user equipment 806.

At #822, the DU 804 sends a context setup response message in response to the context setup request message of #816. In some examples, this response message indicates a cell group configuration.

At #824, the CU 802 sends an RRC reconfiguration message to the user equipment 806. In some examples, this configures the secondary cells for the user equipment 806.

At #826, the user equipment 806 responds to the RRC reconfiguration message of #824 with an RRC configuration complete message.

At #828, at some later point in time, the DU 804 may activate or deactivate one or more cells with respect to the user equipment 806. In some examples, this message may be carried by MAC-CE signaling (e.g., without involvement by the CU 802). In other examples, the CU 802 may activate or deactivate a cell (e.g., in totality) via RRC signaling. For example, the DU 804 may send a message to the CU 802 asking the CU 802 to send an RRC message to the UE 806 to activate or deactivate a cell.

In some scenarios, a cell served by a DU may be deactivated for energy saving (e.g., in the absence of nearby UE activity). In such scenarios, it may be desirable for the cell to subsequently be reactivated when a UE shows up in the area of the cell so that the DU cell can provide access, services, or mobility support for the UE.

As discussed above, conventionally, a cell served by a DU is activated/deactivated by the CU. A CU could rely on a measurement report from a UE based on transmissions by the cell and use existing procedures to activate/deactivate the cell. This solution works for connected UEs, but does not address the scenario where a non-connected UE enters the coverage of a cell. Two examples of such a CU-DU split architecture are illustrated in FIGS. 9 and 10.

Figure 9:
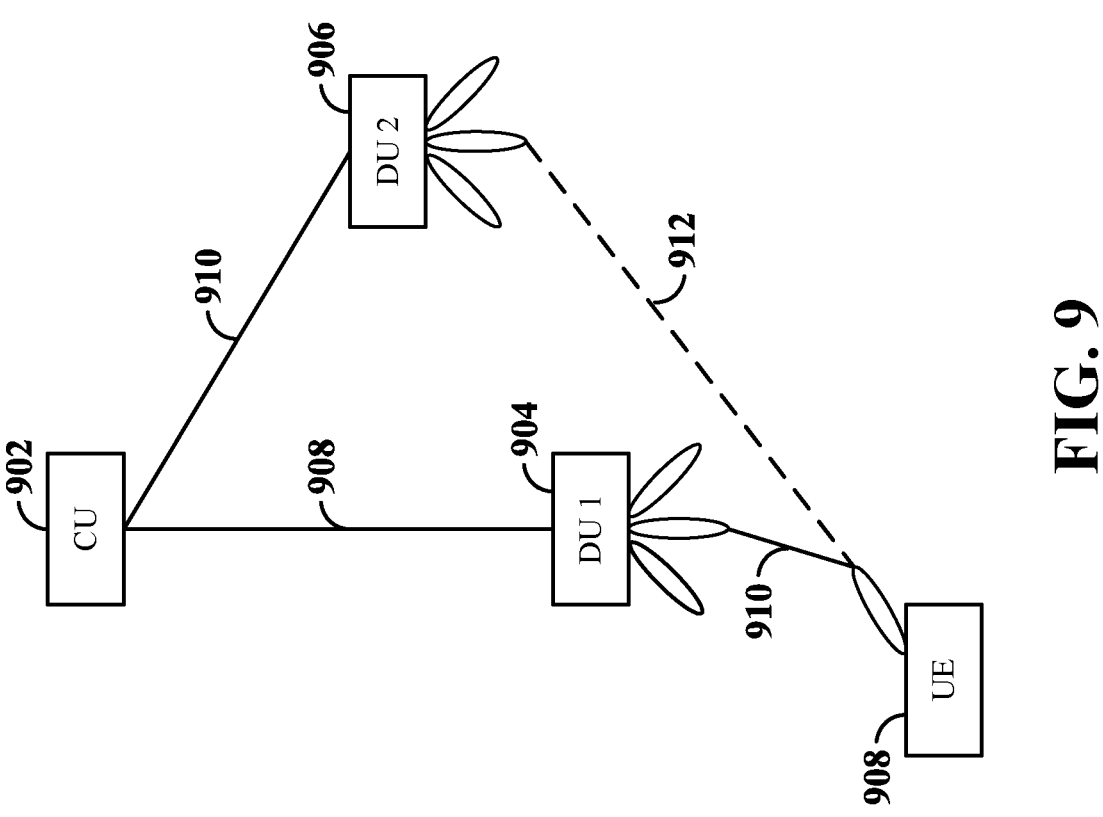
FIG. 9 is a schematic illustration of a wireless communication system according to some aspects.

FIG. 9 illustrates an example of a CU-DU split architecture 900, where a CU 902 controls a first DU 904 and a second DU 906. The CU 902 communicates with the first DU 904 via a first interface (e.g., an F1 interface) 908, and communicates with the second DU 906 via a second interface (e.g., an F1 interface) 910. Each DU serves a cell and provides cell information to the CU 902, and the CU 902 controls the activation and deactivation of a cell. In some examples, the CU 902 may correspond to any of the CUs, base stations, or scheduling entities shown in any of FIGS. 1-3, 5, 6, 8, 10, 11, 12, 13, and 17. In some examples, the first DU 904 and the second DU 906 may correspond to any of the DUs, base stations, or scheduling entities shown in any of FIGS. 1-3, 5, 6, 8, 10, 11, 12, 13, and 15.

FIG. 10 illustrates an example of another CU-DU split architecture 1000, where a first CU 1002 controls a first DU 1004 and a second CU 1006 control a second DU 1008. The first CU 1002 communicates with the first DU 1004 via a first interface (e.g., an F1 interface) 1010, while the second CU 1006 communicates with the second DU 1008 via a second interface (e.g., an F1 interface) 1012. In addition, the first CU 1002 and the second CU 1006 communicate via a third interface 1014 (e.g., an Xn interface). Each DU serves one or more cells and provides cell information to its associated CU, and each CU controls the activation and deactivation of a cell of an associated DU. In some examples, the first CU 1002 and the second CU 1006 may correspond to any of the CUs, base stations, or scheduling entities shown in any of FIGS. 1-3, 5, 6, 8, 9, 11, 12, 13, and 17. In some examples, the first DU 1004 and the second DU 1008 may correspond to any of the DUs, base stations, or scheduling entities shown in any of FIGS. 1-3, 5, 6, 8, 9, 11, 12, 13, and 15.

In either architecture, the cell of the first DU may be activated, while the cell of the second DU is deactivated (e.g., for the purpose of energy saving). For example, in FIG. 9, the cell of the first DU 904 is initially activated by the CU 902 and the cell of the second DU 906 is initially deactivated by the CU 902. Similarly, in FIG. 10, the cell of the first DU 1004 is initially activated by the first CU 1002 and the cell of the second DU 1008 is initially deactivated by the second CU 1006.

In either case, a UE may enter the coverage of the cell of the first DU and either connects to the cell of the first DU or attempts to connect to the cell of the first DU. For example, in FIG. 9, a UE 908 connects or attempts to connect to the cell of the first DU 904 via a first link 910. Similarly, in FIG. 10, a UE 1016 connects or attempts to connect to the cell of the first DU 1004 via a first link 1018.

In either case, it may be desirable for the cell of the second DU to be activated in certain scenarios. For example, it may be desirable to activate the cell of the second DU if the UE connected to the cell of the first DU, to support UE mobility to the cell of the second DU (e.g., via a second link 912 in FIG. 9 or a second link 1020 in FIG. 10). As another example, it may be desirable to activate the cell of the second DU if the UE did not connect yet to the cell of the first DU, so that the cell of the second DU may provide an alternative cell for initial access of the UE (e.g., via the second link 912 in FIG. 9 or the second link 1020 in FIG. 10).

Summarizing the above scenarios, the cell of the second DU may be deactivated when there is no or low UE activity to allow for network energy saving. Subsequently, the cell of the second DU may be activated when there is UE activity (or an increase in UE activity) to avoid impacting the performance/experience of the UE.

As mentioned above, in a conventional cell activation/ deactivation scheme, after a cell of a DU is deactivated, the DU only activates the cell based on an instruction from the associated CU. To support the scenarios of FIGS. 9 and 10, activation of a DU cell by the associated CU may present one or more issues. For example, if the UE is connected to the cell of the first DU, since the cell of the second DU has no active broadcast, the CU for the first DU cannot rely on UE measurements to determine whether to activate the cell of the second DU (in the example of FIG. 9) or ask the second CU to activate the cell of the second DU (in the example of FIG. 10). As another example, if the UE did not connect yet to the cell of the first DU, the CU of the first DU is not aware of the UE's access attempts. Thus, in the example of FIG. 9, the CU 902 would not know to activate the cell of the second DU 906. Similarly, in the example of FIG. 10, the first CU 1002 would not know request the second CU 1006 to activate the cell of the second DU 1008.

The disclosure relates in some aspects to techniques that may be used to activate a deactivated cell in the event a UE is enters the coverage of the cell. For example, a DU may initiate activation of a cell upon detecting UE activity within or near the coverage of that cell. Here, the DU may be configured to monitor for such activity. In some examples, a DU may measure UE-related signals on a cell that was deactivated by a CU (where the DU does not transmit signals on the cell to conserve energy). In some examples, the DU may use one or more sensors to detect the presence of a UE within a deactivated cell.

The above measurements may be for UL UE activity or DL cell activity (e.g., signaling between a serving gNB and a UE). In some examples, a DU may monitor for idle mode signaling (e.g., random access channel (RACH) messages). In some examples, a DU may monitor for connected mode signaling (e.g., RRC messages). In some examples, a DU may monitor for an increase in signal energy on a cell (e.g., an increase in signal power on non-SSB resources) which may be indicative of UE activity. Measurements may be received signal strength indication (RSSI) based and/or reference signal received power (RSRP) based (and/or based on signal-to-noise ratio (SNR), signal-to-interference-and-noise ratio (SINR), channel quality indicator (CQI), precoding matrix indicator (PMI), layer indicator (LI), rank indicator (RI), reference signal received quality (RSRQ), etc.) in some examples. Measurements may be associated with a TDD configuration of a cell for differentiation between downlink and uplink in some examples. Measurements may be associated with an intended TDD DL-UL configuration of a cell in some examples. This allows a transmission configuration and/or scheduling event at an aggressor cell to be associated with an interference measurement at a victim cell. For example, a CU may provide a DU (or other gNB) with an intended TDD DL-UL configuration of a neighbor cell. The DU may return measurements associated with a period of the configuration (e.g., an average value over the active slots within a period), a slot index within the configuration (potentially averaged over multiple periods), the UL (or DL) resources of the configuration, or a combination thereof. The measurements may be forwarded to the neighbor cell via an F1 interface and/or an Xn interface.

In some examples, the DU measurements may be based on cell information of a cell served by the DU or a neighbor DU (for the latter case, served cell information may be provided by the CU). For example, measurements may be performed on frequency of the served cell. As another example, the CU may configure a listen mode for a cell served by the DU. Cell information (e.g., for the served cell and/or a neighbor cell) may include center frequency, bandwidth (e.g., a list of carriers), coverage (e.g., transmit power, beam direction, and/or beam width), RACH resources, RACH configuration (e.g., the RACH preambles, slots, RACH occasions being used by a neighboring cell, etc.), and other types of information.

In some examples, measurements may be configured by the CU (e.g., the CU may send configuration information to the DU that the DU can use to conduct and/or report measurements). For example, the CU may provide time, frequency and spatial resources based on which measurements are performed by the DU (or other gNB). The report by the DU may indicate an associated measurement configuration by the CU. The DU may receive a separate reporting configuration for reporting the measurements (e.g., indicating support for periodic and/or event-triggered measurement reports by the DU (or other gNB)). These configurations may be sent via an F1 interface and/or an Xn interface. In some examples, a configuration may specify that a DU is to measure for a period of time. In some examples, a configuration may specify that a DU is to measure over multiple periods of time. In some examples, a configuration may specify that a DU is to send a report in response to a trigger event.

Figure 11:
FIG. 11 is a signaling diagram illustrating an example of cell activation-related signaling according to some aspects.

FIG. 11 is a signaling diagram 1100 illustrating an example of cell activation in a wireless communication system including a DU 1102, a CU 1104, a UE 1106, and neighbor cell 1108. In some examples, the DU 1102 may correspond to any of the DUs, base stations, or scheduling entities shown in any of FIGS. 1-3, 5, 6, 8, 9, 10, 12, 13, and 15. In some examples, the CU 1104 may correspond to any of the CUs, base stations, or scheduling entities shown in any of FIGS. 1-3, 5, 6, 8, 9, 10, 12, 13, and 17. In some examples, the UE 1106 may correspond to any of the UEs or scheduled entities shown in any of FIGS. 1-3, 5, 6, 8, 9, and 10. In some examples, the neighbor cell 1108 may correspond to any of the DUs, base stations, or scheduling entities shown in any of FIGS. 1-3, 5, 6, 8, 9, 10, 12, 13, and 15.

At optional #1110 of FIG. 11 (e.g., for Scheme 2), the CU 1104 may send configuration information to the DU 1102 (e.g., via an F1 interface or some other suitable interface). In some examples, the configuration information may indicate a trigger for the DU 1102 transmit an indication/request relating to cell activation to the CU 1104.

At optional #1112, the DU 1102 may monitor for transmissions by the UE 1106. For example, the DU 1102 may monitor for UE connected-mode signaling, UE RACH signaling, or some other type of signaling.

At optional #1114, the DU 1102 may monitor for transmissions by the neighbor cell 1108 (e.g., a cell of a neighbor DU) to UE 1106. For example, the DU 1102 may monitor for connected-mode signaling, RACH signaling, or some other type of signaling.

At optional #1116, the DU 1102 may monitor for OTA transmissions by the neighbor cell 1108 to DU 1102. For example, the DU 1102 may monitor for RACH signaling or some other type of signaling directed to the DU 1102. In this case, the CU 1104 and/or some other CU may provide a configuration to both the transmitter and the receiver of the OTA transmissions. In some examples, the configuration may indicate at least one of: a center frequency at which the OTA transmissions may be received, a bandwidth over which the OTA transmissions may be received, a time interval during which the OTA transmissions may be received, a spatial direction at which the OTA transmissions may be received, a coverage area within which the OTA transmissions may be received, a random access channel (RACH) preamble, a RACH configuration, or a RACH resource on which the OTA transmissions may be received.

At #1118, the DU 1102 identifies the presence of the UE 1106 within or near the coverage of the cell of the DU 1102. For example, the DU 1102 may make this determination based on the monitoring of #1112, the monitoring of #1114, the monitoring of #1116, sensor-based monitoring, some other type of monitoring, or a combination thereof.

At #1120, the DU 1102 sends a cell activation indication/request to the CU 1104 (e.g., via an F1 interface or some other suitable interface). As discussed herein, in some examples, the DU 1102 sends an indication that the DU 1102 activated as cell to the CU 1104. In some examples, the DU 1102 sends a request for activation of a cell to the CU 1104. In some examples, the sending of the cell activation indication/request by the DU 1102 may be triggered based on the configuration information received at #1110.

At #1122, the CU 1104 sends a response to the DU 1032 (e.g., via an F1 interface or some other suitable interface). In some examples (e.g., if the DU 1102 sent an indication that a cell has been activated at #1108), the CU 1104 may send a confirmation of the activation to the DU 1102. In some examples (e.g., if the DU 1102 sent a request to activate a cell at #1108), the CU 1104 may send an instruction to activate the cell or a rejection of the request to the DU 1102.

Different cell activation schemes may be used in different examples. Three examples of cell activations are set forth below. Other schemes may be used in other examples.

In a first cell activation scheme (Scheme 1), the second DU indicates/requests activation of its cell from/to the associated CU, where the trigger of the indication/request is not configured by the associated CU. For example, the second DU may decide on its own whether to transmit the indication/request. In examples where the second DU elects to activate the cell, the second DU may commence reference signal (e.g. SSB and/or CSI-RS) transmissions on the cell.

In a second cell activation scheme (Scheme 2), the second DU indicates/requests activation of its cell from/to the associated CU, where the trigger of the indication/request is configured by the associated CU.

In a third cell activation scheme (Scheme 3), the associated CU initially activates the cell of the second DU. The second DU subsequently activates transmission of a reference signal of the cell upon detecting UE activity (e.g., within or near the coverage of the cell).

Examples of triggers in the above schemes may include one or more of the following. In some examples, a trigger is based on a detected UE random access channel (RACH) preamble. In some examples, a trigger is based on a detected UL connected-UE communication. In some examples, a trigger is based on a detected DL DU 1 UE-associated activity. In some examples, a trigger is based on a detected OTA reference signal from a neighbor DU. In some examples, a trigger is based on a sensor information (e.g., from a camera, a radar detector, an infrared detector, etc.). For sniffing-related triggers, a trigger may RSSI-based, RSRP-based, based on some other measurement metric(s), or a combination of thereof.

In some examples, the second DU may receive information associated with the cell of the first DU to facilitate monitoring. For example, for RSSI or RSRP measurements, the second DU may receive center frequency and information, an intended TDD configuration, or coverage information. As another example, for RSRP measurements, the second DU may receive an indication of the RACH resources and configuration used by the cell of the first DU.

Figure 12:
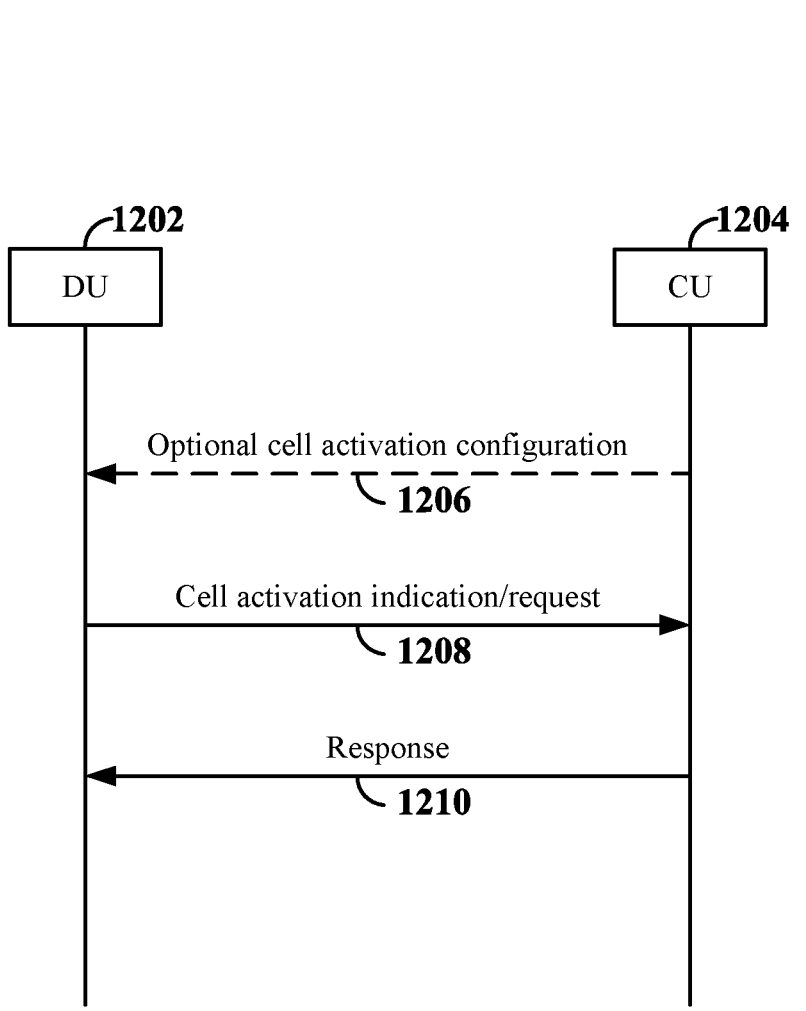
FIG. 12 is a signaling diagram illustrating an example of cell activation-related signaling according to some aspects.

FIG. 12 is a signaling diagram 1200 illustrating an example of cell activation in a wireless communication system including a DU 1202 and a CU 1204. In some aspects, FIG. 12 illustrates an example of signaling for Scheme 1 discussed above. In some aspects, FIG. 12 illustrates and example of signaling for Scheme 2 discussed above. In some examples, the DU 1202 may correspond to any of the DUs, base stations, or scheduling entities shown in any of FIGS. 1-3, 5, 6, 8, 9, 10, 11, 13, and 15. In some examples, the CU 1204 may correspond to any of the CUs, base stations, or scheduling entities shown in any of FIGS. 1-3, 5, 6, 8, 9, 10, 11, 13, and 17.

At optional #1206 of FIG. 12 (e.g., for Scheme 2), the CU 1204 may send configuration information to the DU 1202 (e.g., via an F1 interface or some other suitable interface). In some examples, the configuration information may indicate a trigger for the DU 1202 transmit an indication/request relating to cell activation to the CU 1204.

At #1208, the DU 1202 sends a cell activation indication/request to the CU 1204 (e.g., via an F1 interface or some other suitable interface). As discussed herein, in some examples, the DU 1202 sends an indication that the DU 1202 activated a cell to the CU 1204. In some examples, the DU 1202 sends a request for activation of a cell to the CU 1204. In addition, for Scheme 2, the sending of the cell activation indication/request by the DU 1202 may be triggered based on the configuration information received at #1206.

At #1210, the CU 1204 sends a response to the DU 1032 (e.g., via an F1 interface or some other suitable interface). In some examples (e.g., if DU 1202 sent an indication that a cell has been activated at #1208), the CU 1204 may send a confirmation of the activation to the DU 1202. In some examples (e.g., if DU 1202 sent a request to activate a cell at #1208), the CU 1204 may send an instruction to activate the cell or a rejection of the request to the DU 1202.

FIG. 13 is a signaling diagram 1300 illustrating an example of cell activation in a wireless communication system including a DU 1302 and a CU 1304. In some aspects, FIG. 13 illustrates an example of signaling for Scheme 3 discussed above. In some examples, the DU 1302 may correspond to any of the DUs, base stations, or scheduling entities shown in any of FIGS. 1-3, 5, 6, 8, 9, 10, 11, 12, and 15. In some examples, the CU 1304 may correspond to any of the CUs, base stations, or scheduling entities shown in any of FIGS. 1-3, 5, 6, 8, 9, 10, 11, 12, and 17.

At #1306 of FIG. 13, the CU 1304 may send an instruction to activate a cell to the DU 1302 (e.g., via an F1 interface or some other suitable interface). In some examples, the cell may be activated in a low-power mode whereby transmissions by the cell are deactivated or otherwise limited.

At #1308, the DU 1302 identifies the presence of a UE within or near the coverage of the cell of the DU 1302. For example, the DU 1302 may make this determination based on monitoring as discussed herein.

At #1310, the DU 1302 activates transmissions on the cell. For example, the DU 1302 may activate SSB and/or CSI-RS transmissions on the cell.

Figure 14:
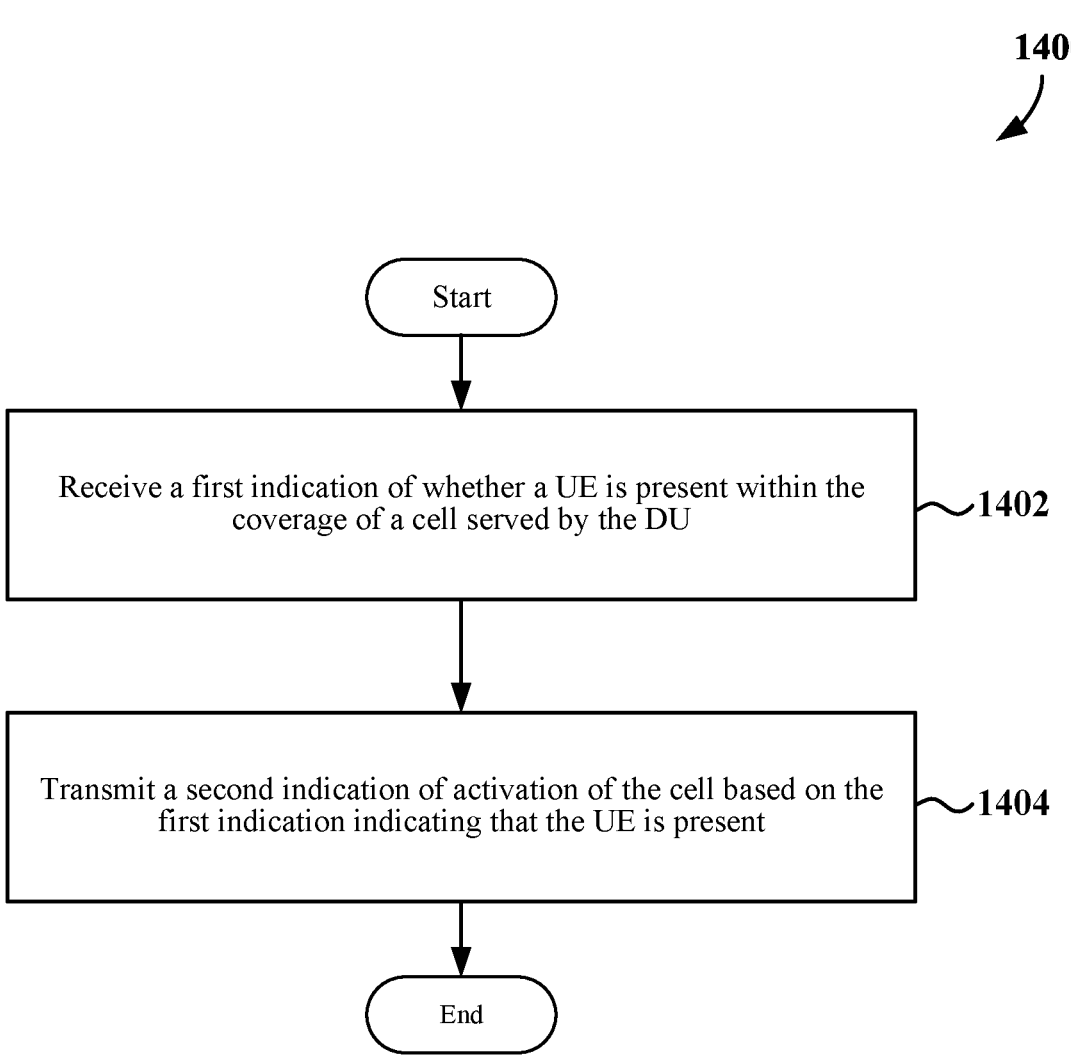
FIG. 14 is a flow chart illustrating an example communication method involving cell activation according to some aspects.

FIG. 14 is a flow chart illustrating an example method 1400 for communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the apparatus 1500 illustrated in FIG. 15. In some examples, the method 1400 may be carried out by any suitable apparatus or means for carrying out the functions or algorithm described below.

At block 1402, a DU receives a first indication of whether a UE is present within the coverage of a cell served by the DU.

At block 1404, the DU transmits a second indication of activation of the cell based on the first indication indicating that the UE is present.

In some examples, the first indication may be a UE transmission (e.g., in the Schemes 1-3 of FIGS. 12 and 13). In some examples, the first indication may be a UE RACH preamble. In some examples, the first indication may be an UL connected-UE communication.

In some examples, the first indication may be a DL communication of a nearby cell, such as a cell served by a second DU or a gNB (e.g., in the Schemes 1-3 of FIGS. 12 and 13). In some examples, the first indication may be over-the-air (OTA) RACH signal transmitted by a nearby base station (a second DU or a gNB) to the DU (e.g., in the Schemes 1-3 of FIGS. 12 and 13). In some examples, the first indication may be sensor information, such as a camera sensing-generated signal, a radar sensing-generated signal, or an infrared sensing-generated signal (e.g., in the Schemes 1-3 of FIGS. 12 and 13).

In some examples, the second indication may be a notification to the CU of activation of the cell (e.g., in the Schemes 1-2 of FIG. 12).

In some examples, the second indication may be a request from the CU to activate the cell (e.g., in the Schemes 1-2 of FIG. 12).

In some examples, the second indication may be transmission of a reference signal of the cell (e.g., in the Scheme 3 of FIG. 13, or following an F1AP notification/request, in the Schemes 1-2 of FIG. 12). In some examples, the reference signal may be SSB or a CSI-RS. In some examples, the transmission may be periodic.

In some examples, the DU may transmit the second indication based on a condition on a measurement of the first indication (e.g., in the Schemes 1-3 of FIGS. 12 and 13). In some examples, the measurement may be RSSI or RSRP. In some examples, the measurement may be SNR, SINR, CQI, PMI, LI, RI, or RSRQ. In some examples, the condition may be received from the CU (e.g., in the Scheme 2 of FIG. 12 and the Scheme 3 of FIG. 13).

In some examples, the DU may receive helper information from the CU to facilitate the reception of the first indication. (e.g., in the Scheme 2 of FIG. 12 and the Scheme 3 of FIG. 13). In some examples, the helper information may include a center frequency and bandwidth over which the first indication may be received. In some examples, the helper information may include a time interval during which the first indication may be received. In some examples, the helper information may include a space direction or coverage area within which the first indication may be received. In some examples, the helper information may include RACH resources and configuration of a neighbor cell, where the first indication comprises a RACH preamble.

Figure 15:
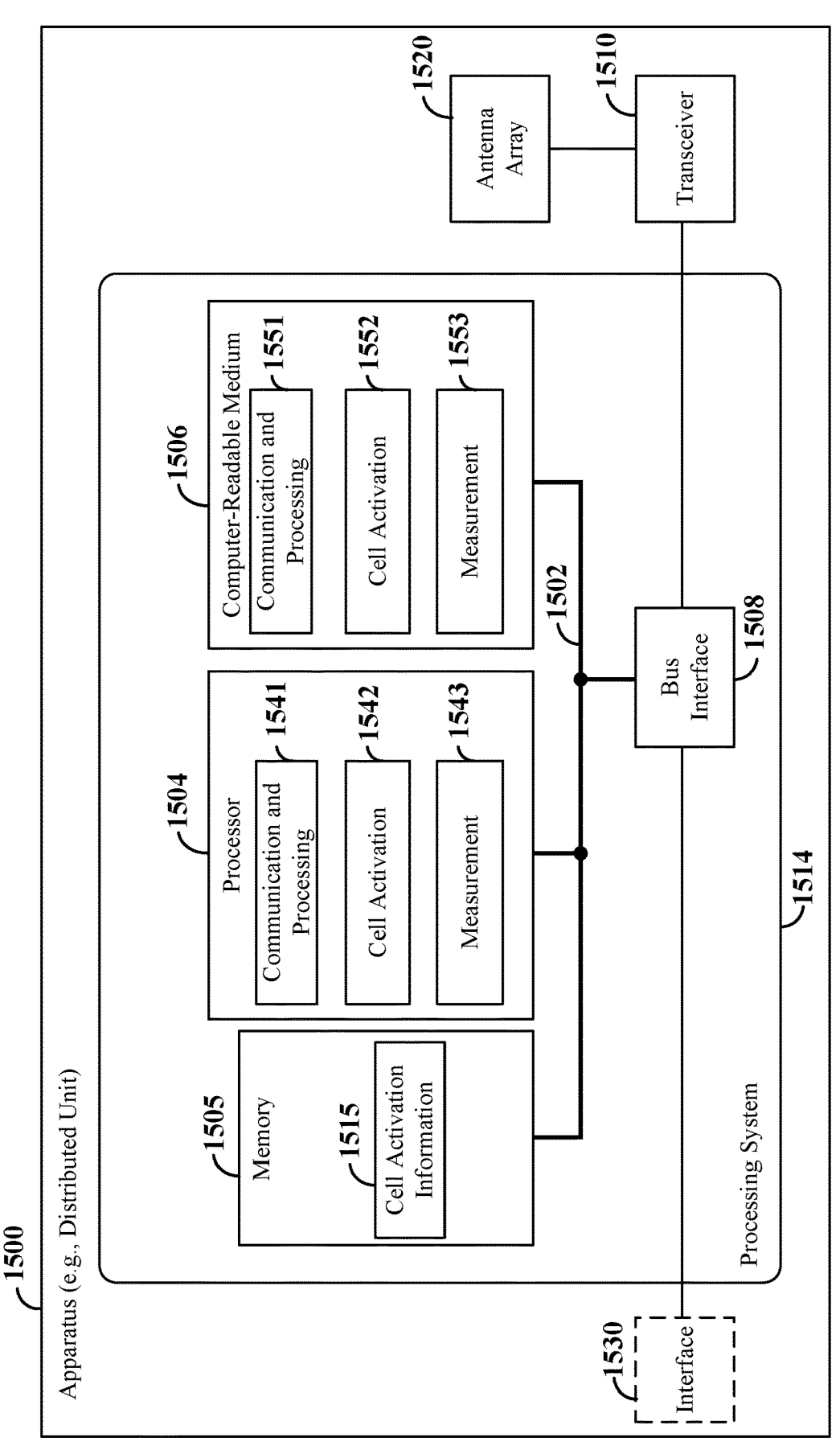
FIG. 15 is a block diagram conceptually illustrating an example of a hardware implementation for an apparatus (e.g., a distributed unit) employing a processing system according to some aspects.

FIG. 15 is a block diagram illustrating an example of a hardware implementation for an apparatus 1500 employing a processing system 1514. For example, the apparatus 1500 may be a device configured to wirelessly communicate in a network as discussed in any one or more of FIGS. 1-14. In some implementations, the apparatus 1500 may correspond to any of the DUs, base stations, or scheduling entities shown in any of FIGS. 1-3, 5, 6, and 8-13.

In accordance with various aspects of the disclosure, an element, or any portion of an element, or any combination of elements may be implemented with the processing system 1514. The processing system 1114 may include one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1500 may be configured to perform any one or more of the functions described herein. That is, the processor 1504, as utilized in an apparatus 1500, may be used to implement any one or more of the processes and procedures described herein.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502, an optional transceiver 1510 and optional antenna array 1520, and between the bus 1502 and an interface 1530. The transceiver 1510 provides a communication interface or means for communicating with various other apparatus over a wireless transmission medium. The interface 1530 provides a communication interface or means of communicating with various other apparatuses and devices (e.g., other devices housed within the same apparatus as the apparatus 1500 or other external apparatuses) over an internal bus or external transmission medium, such as an Ethernet cable. Depending upon the nature of the apparatus, the interface 1530 may include a user interface (e.g., keypad, display, speaker, microphone, joystick). Of course, such a user interface is optional, and may be omitted in some examples.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software. For example, the memory 1505 may store cell identification information 1515 (e.g., configuration information) used by the processor 1504 for the communication operations described herein.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1500 may be configured to perform any one or more of the operations described herein (e.g., as described above in conjunction with FIGS. 1-14 and as described below in conjunction with FIG. 16). In some aspects of the disclosure, the processor 1504, as utilized in the apparatus 1500, may include circuitry configured for various functions.

The processor 1504 may be configured to generate, schedule, and modify a resource assignment or grant of time-frequency resources (e.g., a set of one or more resource elements). For example, the processor 1504 may schedule time-frequency resources within a plurality of time division duplex (TDD) and/or frequency division duplex (FDD) subframes, slots, and/or mini-slots to carry user data traffic and/or control information to and/or from multiple scheduled entities. The processor 1504 may be configured to schedule resources for the transmission of downlink signals. The processor 1504 may further be configured to schedule resources for the transmission of uplink signals.

In some aspects of the disclosure, the processor 1504 may include communication and processing circuitry 1541. The communication and processing circuitry 1541 may be configured to communicate with a user equipment. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

The communication and processing circuitry 1541 may further be configured to receive a message from a UE. For example, the message may be included in a MAC-CE carried in a Uu PUSCH, or included in a Uu RRC message, or included in a dedicated Uu PUCCH. The communication and processing circuitry 1541 may further be configured to receive a scheduling request from a UE for an uplink grant or a sidelink grant. The communication and processing circuitry 1541 may further be configured to send a message to a UE. For example, the message may be included in a MAC-CE carried in a Uu PDSCH, or included in a Uu RRC message, or included in a dedicated Uu PDCCH.

In some implementations where the communication involves obtaining (e.g., receiving) information, the communication and processing circuitry 1541 may obtain information from a component of the apparatus 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may receive one or more of signals, messages, SCIs, feedback, other information, or any combination thereof. In some examples, the communication and processing circuitry 1541 may receive information via one or more channels. In some examples, the communication and processing circuitry 1541 may include functionality for a means for obtaining (e.g., receiving). In some examples, the communication and processing circuitry 1541 may include functionality for a means for decoding. In some examples, the communication and processing circuitry 1541 may include functionality for a means for obtaining an indication. In some examples, the communication and processing circuitry 1541 and/or the transceiver 1510 may include functionality for a means for receiving an indication.

In some implementations where the communication involves outputting (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may send one or more of signals, messages, feedback, other information, or any combination thereof. In some examples, the communication and processing circuitry 1541 may send information via one or more channels. In some examples, the communication and processing circuitry 1541 may include functionality for a means for outputting (e.g., sending or transmitting). In some examples, the communication and processing circuitry 1541 may include functionality for a means for encoding. In some examples, the communication and processing circuitry 1541 may include functionality for a means for outputting an indication. In some examples, the communication and processing circuitry 1541 and/or the transceiver 1510 may include functionality for a means for transmitting an indication.

The processor 1504 may include cell activation circuitry 1542 configured to perform cell activation-related operations as discussed herein (e.g., one or more of the operations described above in conjunction with FIGS. 6-14). The cell activation circuitry 1542 may be configured to execute cell activation software 1552 included on the computer-readable medium 1506 to implement one or more functions described herein.

The cell activation circuitry 1542 may include functionality for a means for obtaining an indication (e.g., as described above in conjunction with FIGS. 6-14). For example, the cell activation circuitry 1542 may receive a signal transmitted to or from a UE. As another example, the cell activation circuitry 1542 may receive a signal transmitted by another cell. As a further example, the cell activation circuitry 1542 may sense the presence of a UE. In some examples, the indication may indicate a condition associated with measurements.

The cell activation circuitry 1542 may include functionality for a means for sensing (e.g., as described above in conjunction with FIGS. 6-14). For example, the cell activation circuitry 1542 may sense the presence of a UE (e.g., within an area corresponding to a cell). In some examples, the cell activation circuitry 1542 may include a sensor. In some examples, the cell activation circuitry 1542 may interact with (e.g., control) a sensor and receive sensing information from the sensor. In some examples, the sensing may include one or more of radar-based sensing, camera-based sensing, infrared-based sensing, or some other type of sensing.

The cell activation circuitry 1542 may include functionality for a means for using a sensor (e.g., as described above in conjunction with FIGS. 6-14). For example, the cell activation circuitry 1542 may use a sensor to sense the presence of a UE (e.g., within an area corresponding to a cell). In some examples, the cell activation circuitry 1542 may interact with (e.g., control) a sensor and receive sensing information from the sensor. In some examples, the sensing may include one or more of radar-based sensing, camera-based sensing, infrared-based sensing, or some other type of sensing.

The cell activation circuitry 1542 may include functionality for a means for obtaining a response to an indication (e.g., as described above in conjunction with FIGS. 6-14). For example, the cell activation circuitry 1542 may receive, from a CU, a response to a request transmitted by the apparatus 1500.

The cell activation circuitry 1542 may include functionality for a means for obtaining information (e.g., as described above in conjunction with FIGS. 6-14). For example, the cell activation circuitry 1542 may receive, from a CU, information associated with reception of an indication (e.g., information associated with transmissions from a neighboring cell).

The cell activation circuitry 1542 may include functionality for a means for outputting an indication (e.g., as described above in conjunction with FIGS. 6-14). For example, the cell activation circuitry 1542 may send a message to a CU (e.g., via an F1 interface). As another example, the cell activation circuitry 1542 may receive a signal transmitted by another cell. As a further example, the cell activation circuitry 1542 may cause a cell to transmit a reference signal.

The cell activation circuitry 1542 may include functionality for a means for determining whether a UE is present within a cell (e.g., as described above in conjunction with FIGS. 6-14). For example, the cell activation circuitry 1542 may determine that a UE is present within a cell based on received signals (e.g., by decoding the signals or measuring a metric such as RSRP, etc.) or sensing (e.g., radar-based detection, etc.).

The cell activation circuitry 1542 may include functionality for a means for obtaining cell activation information (e.g., as described above in conjunction with FIGS. 6-14). For example, the cell activation circuitry 1542 may receive a message from a CU (e.g., via an F1 interface), where the message includes cell activation information.

The processor 1504 may include measurement circuitry 1543 configured to perform measurement-related operations as discussed herein (e.g., one or more of the operations described above in conjunction with FIGS. 6-14). The measurement circuitry 1543 may be configured to execute measurement software 1553 included on the computer-readable medium 1506 to implement one or more functions described herein.

The measurement circuitry 1543 may include functionality for a means for measuring a signal (e.g., as described above in conjunction with FIGS. 6-14). For example, the measurement circuitry 1543 may cooperate with the communication and processing circuitry 1541 to measure RSSI or RSRP of signals transmitted on a frequency band specified by a measurement configuration.

The measurement circuitry 1543 may include functionality for a means for outputting measurement information (e.g., as described above in conjunction with FIGS. 6-14). For example, the measurement circuitry 1543 may send a measurement report to a CU (e.g., via an F1 interface).

The measurement circuitry 1543 may include functionality for a means for outputting a measurement report (e.g., as described above in conjunction with FIGS. 6-14). For example, the measurement circuitry 1543 may send a measurement report based on configuration information to a CU (e.g., via an F1 interface).

FIG. 16 is a flow chart illustrating an example method 1600 for communication (e.g., wireless communication) in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the apparatus 1500 illustrated in FIG. 15. In some examples, the method 1600 may be carried out by any suitable apparatus or means for carrying out the functions or algorithm described below.

At block 1602, a first apparatus may obtain a first indication that is indicative of whether a user equipment is present within a coverage of a cell served by the first apparatus. In some examples, the cell activation circuitry 1542, shown and described in FIG. 15, may provide a means to obtain a first indication that is indicative of whether a user equipment is present within a coverage of a cell served by the first apparatus. In some examples, the cell activation circuitry 1542 together with the communication and processing circuitry 1541 and the transceiver 1510, shown and described in FIG. 15, may provide a means to obtain a first indication that is indicative of whether a user equipment is present within a coverage of a cell served by the first apparatus. In some examples, the communication and processing circuitry 1541 and/or the transceiver 1510, shown and described in FIG. 15, may provide a means to obtain a first indication that is indicative of whether a user equipment is present within a coverage of a cell served by the first apparatus.

At block 1604, the first apparatus may output, for transmission to a second apparatus, a second indication associated with activation of the cell, the outputting of the second indication being based on the first indication indicating that the user equipment is present within the coverage of the cell. In some examples, the cell activation circuitry 1542, shown and described in FIG. 15, may provide a means to output, for transmission to a second network entity, a second indication associated with activation of the cell, the outputting of the second indication being based on the first indication indicating that the user equipment is present within the coverage of the cell. In some examples, the cell activation circuitry 1542 together with the communication and processing circuitry 1541 and the transceiver 1510, shown and described in FIG. 15, may provide a means to output, for transmission to a second network entity, a second indication associated with activation of the cell, the outputting of the second indication being based on the first indication indicating that the user equipment is present within the coverage of the cell. In some examples, the communication and processing circuitry 1541 and/or the transceiver 1510, shown and described in FIG. 15, may provide a means to output, for transmission to a second network entity, a second indication associated with activation of the cell, the outputting of the second indication being based on the first indication indicating that the user equipment is present within the coverage of the cell.

In some examples, the first apparatus does not have a connection with the user equipment. In some examples, the first apparatus not having a connection with the user equipment refers to a scenario where the user equipment that has not established an RRC connection via the first apparatus.

In some examples, the first apparatus may determine, based on the first indication, that that the user equipment is present within the coverage of the cell. In some examples, the outputting of the second indication for transmission is based on the determination that the user equipment is present within the coverage of the cell.

In some examples, the first indication may include a signal (e.g., an uplink signal) transmitted by the user equipment. In some examples, the signal may include a random access channel (RACH) preamble. In some examples, the signal may include connected mode signaling.

In some examples, the first indication may include a signal transmitted to the user equipment. In some examples, the first indication may include a signal (e.g., a downlink) signal transmitted by a network entity.

In some examples, obtaining the first indication may include using a sensor to sense the user equipment. In some examples, obtaining the first indication may include sensing the user equipment.

In some examples, the second indication indicates that the first apparatus activated the cell.

In some examples, the second indication may include a request to activate the cell. In some examples, the first apparatus may obtain, from the second apparatus, a response to the second indication, the response instructing the first apparatus to activate the cell.

In some examples, the second indication may include a reference signal of the cell. In some examples, the reference signal may include a synchronization signal block (SSB) or a channel state information-reference signal (CSI-RS).

In some examples, the first apparatus may output the second indication for transmission based on a condition indicated by a measurement associated with the first indication. In some examples, the measurement associated with the first indication may include a reference signal received power (RSRP) measurement. In some examples, the measurement associated with the first indication may include a received signal strength indication (RSSI) measurement. In some examples, the measurement associated with the first indication may include at least one of: a signal-to-noise ratio (SNR) measurement, a signal-to-interference-and-noise ratio (SINR) measurement, a channel quality indication (CQI) measurement, a precoding matric indicator (PMI) measurement, a layer indicator (LI) measurement, a rank indicator (RI) measurement, or a reference signal received quality (RSRQ) measurement. In some examples, the first apparatus may obtain an indication of the condition from the second apparatus.

In some examples, the first apparatus may obtain, from the second apparatus, information associated with reception of the first indication. In some examples, the information may be associated with a determination of whether a user equipment is present within a coverage of a cell.

In some examples, the information may include a center frequency at which the first indication is to be (e.g., may be) received. In some examples, the information may include a bandwidth over which the first indication is to be received. In some examples, the information may include a time interval during which the first indication is to be received. In some examples, the information may include a spatial direction at which the first indication is to be received. In some examples, the information may include a coverage area within which the first indication may be received. In some examples, the first indication may include a random access channel (RACH) preamble. In some examples, the information may include a RACH resource on which the first indication is to be received.

In some examples, the first indication may include a random access channel (RACH) preamble. In some examples, the information may include a RACH configuration associated with the first indication.

In some examples, the first apparatus may include a transceiver configured to receive the first indication and transmit the second indication, wherein the first apparatus is configured as a network entity.

In one configuration, the apparatus 1500 includes means for obtaining a first indication that is indicative of whether a user equipment is present within a coverage of a cell served by the first apparatus, and means for outputting, for transmission to a second network entity, a second indication associated with activation of the cell, the outputting of the second indication being based on the first indication indicating that the user equipment is present within the coverage of the cell. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS. 1-3, 5, 6, 8-13, and 15, and utilizing, for example, the methods and/or algorithms described herein in relation to FIG. 16.

Figure 17:
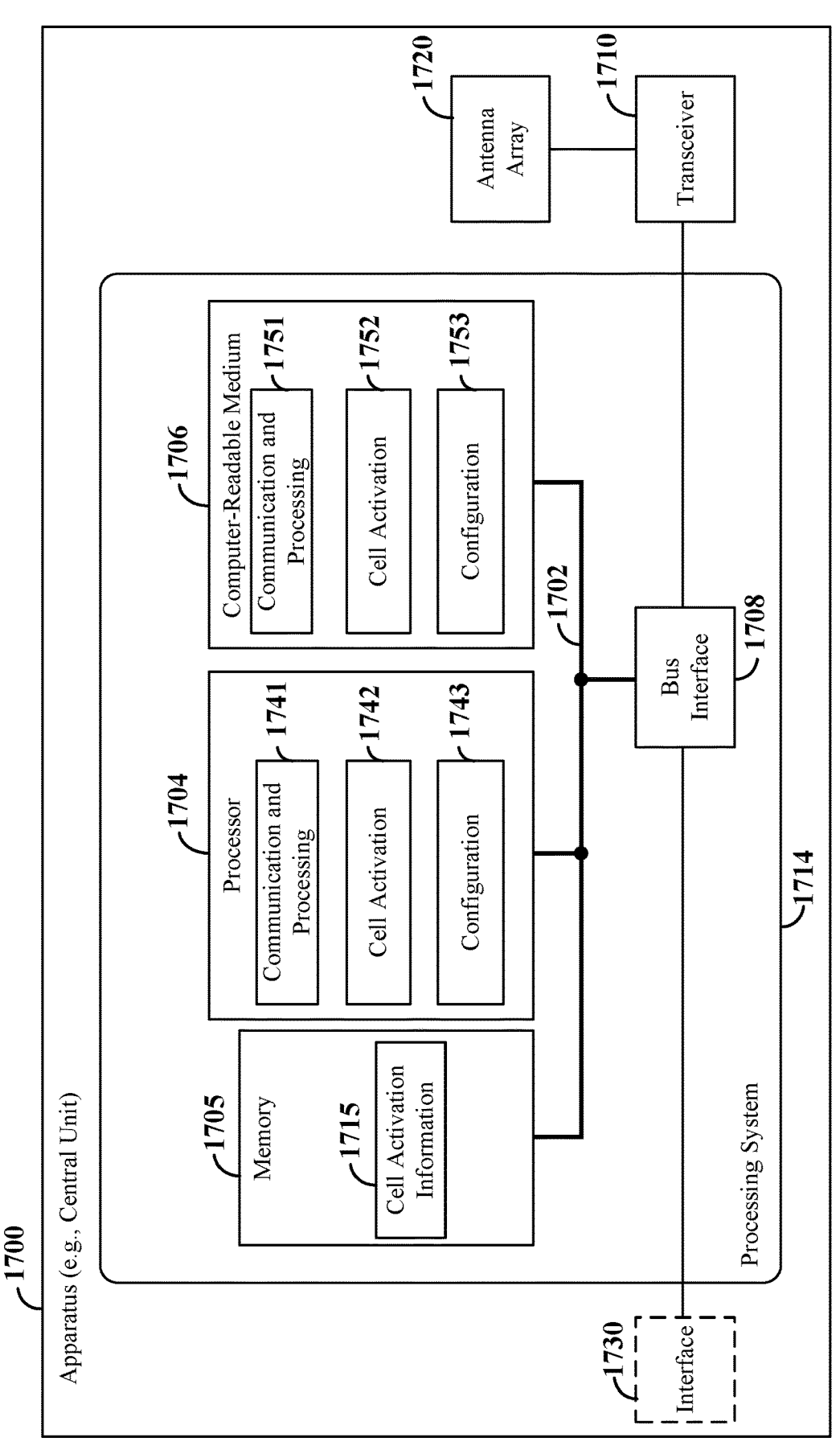
FIG. 17 is a block diagram conceptually illustrating an example of a hardware implementation for an apparatus (e.g., a central unit) employing a processing system according to some aspects.

FIG. 17 is a conceptual diagram illustrating an example of a hardware implementation for an apparatus 1700 employing a processing system 1714. In some implementations, the apparatus 1700 may correspond to any of the CUs, base stations, or scheduling entities shown in any of FIGS. 1-3, 5, 6, 8-13, and 15.

In accordance with various aspects of the disclosure, an element, or any portion of an element, or any combination of elements may be implemented with the processing system 1714. The processing system may include one or more processors 1704. The processing system 1714 may be substantially the same as the processing system 1514 illustrated in FIG. 15, including a bus interface 1708, a bus 1702, memory 1705, a processor 1704, a computer-readable medium 1706, an optional transceiver 1710, and an optional antenna array 1720. The memory 1705 may store cell activation information 1715 (e.g., configuration information) used by the processor 1704 (e.g., in cooperation with the transceiver 1710) for communication operations as described herein. Furthermore, the apparatus 1700 may include an interface 1730 (e.g., a network interface) that provides a means for communicating with at least one other apparatus within a core network and/or with at least one radio access network.

The apparatus 1700 may be configured to perform any one or more of the operations described herein (e.g., as described above in conjunction with FIGS. 1-14 and as described below in conjunction with FIG. 18). In some aspects of the disclosure, the processor 1704, as utilized in the apparatus 1700, may include circuitry configured for various functions.

In some aspects of the disclosure, the processor 1704 may include communication and processing circuitry 1741. The communication and processing circuitry 1741 may be configured to communicate with one or more network entities. The communication and processing circuitry 1741 may include one or more hardware components that provide the physical structure that performs various processes related to communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. The communication and processing circuitry 1741 may further be configured to execute communication and processing software 1751 included on the computer-readable medium 1706 to implement one or more functions described herein.

In some implementations wherein the communication involves obtaining (e.g., receiving) information, the communication and processing circuitry 1741 may obtain information from a component of the apparatus 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for obtaining (e.g., receiving). In some examples, the communication and processing circuitry 1741 may include functionality for a means for decoding. In some examples, the communication and processing circuitry 1741 may include functionality for a means for obtaining an indication. In some examples, the communication and processing circuitry 1741 and/or the transceiver 1710 may include functionality for a means for receiving an indication.

In some implementations wherein the communication involves outputting (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for outputting (e.g., sending or transmitting). In some examples, the communication and processing circuitry 1741 may include functionality for a means for encoding. In some examples, the communication and processing circuitry 1741 may include functionality for a means for outputting an indication. In some examples, the communication and processing circuitry 1741 and/or the transceiver 1710 may include functionality for a means for transmitting an indication.

The processor 1704 may include cell activation circuitry 1742 configured to perform cell activation-related operations as discussed herein (e.g., one or more of the operations described above in conjunction with FIGS. 6-14). The cell activation circuitry 1742 may be configured to execute cell activation software 1752 included on the computer-readable medium 1706 to implement one or more functions described herein.

The cell activation circuitry 1742 may include functionality for a means for obtaining an indication (e.g., as described above in conjunction with FIGS. 6-14). For example, the cell activation circuitry 1742 may receive a message from a DU.

The cell activation circuitry 1742 may include functionality for a means for outputting an indication (e.g., as described above in conjunction with FIGS. 6-14). For example, the cell activation circuitry 1742 may send a message to a DU (e.g., via an F1 interface).

The cell activation circuitry 1742 may include functionality for a means for outputting a response to an indication (e.g., as described above in conjunction with FIGS. 6-14). For example, the cell activation circuitry 1742 may send, to a DU, a response to a request transmitted by the DU.

The cell activation circuitry 1742 may include functionality for a means for outputting information (e.g., as described above in conjunction with FIGS. 6-14). For example, the cell activation circuitry 1742 may send, to a DU, information associated with reception of an indication (e.g., information associated with transmissions from a neighboring cell).

The processor 1704 may include configuration circuitry 1743 configured to perform configuration-related operations as discussed herein (e.g., one or more of the operations described above in conjunction with FIGS. 6-14). The configuration circuitry 1743 may be configured to execute configuration software 1753 included on the computer-readable medium 1706 to implement one or more functions described herein.

The configuration circuitry 1743 may include functionality for a means for obtaining measurement information (e.g., as described above in conjunction with FIGS. 6-14). For example, the configuration circuitry 1743 may receive a measurement report from a DU via an F1 interface.

The configuration circuitry 1743 may include functionality for a means for outputting a message (e.g., as described above in conjunction with FIGS. 6-14). For example, the configuration circuitry 1743 may send a message to a DU via an F1 interface or to a base station via an Xn interface.

The configuration circuitry 1743 may include functionality for a means for determining whether to activate or deactivate a cell (e.g., as described above in conjunction with FIGS. 6-14). For example, the configuration circuitry 1743 may determine based on a received message whether there are any UEs in the vicinity of a cell and elect to activate the cell if there is at least one UE in the vicinity of the cell or deactivate the cell if there are no UEs in the vicinity of the cell.

In some examples, the apparatus 1700 shown and described above in connection with FIG. 17 may be a disaggregated base station. For example, the apparatus 1700 shown in FIG. 17 may include the CU and optionally one or more DUs/RUs of the disaggregated base station. Other DUs/RUs associated with the apparatus 1700 may be distributed throughout the network. In some examples, the DUs/RUs may correspond to TRPs associated with the network entity. In some examples, the CU and/or DU/RU of the disaggregated base station (e.g., within the apparatus 1700) may generate at least one message and provide the at least one indication to a DU or some other network entity.

FIG. 18 is a flow chart illustrating an example method 1800 for communication (e.g., wireless communication) in accordance with some aspects of the present disclosure. As described below, some or all illustrated features may be omitted in a particular implementation within the scope of the present disclosure, and some illustrated features may not be required for implementation of all examples. In some examples, the method 1800 may be carried out by the apparatus 1700 illustrated in FIG. 17. In some examples, the method 1800 may be carried out by any suitable apparatus or means for carrying out the functions or algorithm described below.

At block 1802, a first apparatus may obtain, from a second apparatus, a first indication associated with activation of a cell served by a second apparatus based on detected presence of a user equipment within the cell. In some examples, the cell activation circuitry 1742, shown and described in FIG. 17, may provide a means to obtain, from a second apparatus, a first indication associated with activation of a cell served by a second apparatus based on detected presence of a user equipment within the cell. In some examples, the cell activation circuitry 1742 together with the communication and processing circuitry 1741 and the transceiver 1710, shown and described in FIG. 17, may provide a means to obtain, from a second apparatus, a first indication associated with activation of a cell served by a second apparatus based on detected presence of a user equipment within the cell. In some examples, the communication and processing circuitry 1741 and/or the transceiver 1710, shown and described in FIG. 17, may provide a means to obtain, from a second apparatus, a first indication associated with activation of a cell served by a second apparatus based on detected presence of a user equipment within the cell.

At block 1804, the first apparatus may output, for transmission to the second apparatus, a second indication responsive to the first indication, the second indication being indicative of the activation of the cell. In some examples, the configuration circuitry 1743, shown and described in FIG. 17, may provide a means to output, for transmission to the second apparatus, a second indication responsive to the first indication, the second indication being indicative of the activation of the cell. In some examples, the configuration circuitry 1743 together with the communication and processing circuitry 1741 and the transceiver 1710, shown and described in FIG. 17, may provide a means to output, for transmission to the second apparatus, a second indication responsive to the first indication, the second indication being indicative of the activation of the cell. In some examples, the communication and processing circuitry 1741 and/or the transceiver 1710, shown and described in FIG. 17, may provide a means to output, for transmission to the second apparatus, a second indication responsive to the first indication, the second indication being indicative of the activation of the cell.

In some examples, the user equipment does not have a connection with the first apparatus. In some examples, the first user equipment that does not have a communication connection with the first apparatus refers to a user equipment that has not established an RRC connection via the first apparatus.

In some examples, the first indication indicates that the first apparatus activated the cell.

In some examples, the first indication may include a request to activate the cell. In some examples, the second indication may include a response instructing the second apparatus to activate the cell.

In some examples, the first indication may include a reference signal of the cell. In some examples, the reference signal may include a synchronization signal block (SSB) or a channel state information-reference signal (CSI-RS).

In some examples, the first apparatus may send, to the second apparatus, information associated with reception of a third indication of whether the user equipment is present within the coverage of the cell. In some examples, the first apparatus may send, to the second apparatus, information associated with a determination of whether the user equipment is present within the coverage of a cell.

In some examples, the information may indicate at least one of a center frequency at which the first indication may be received. In some examples, the information may indicate a bandwidth over which an indication may be received by the second apparatus. In some examples, the information may indicate a time interval during which an indication may be received by the second apparatus. In some examples, the information may indicate a spatial direction at which an indication may be received by the second apparatus. In some examples, the information may indicate a coverage area within which an indication may be received by the second apparatus. In some examples, the third indication may include a random access channel (RACH) preamble. In some examples, the information may include a RACH resource on which the third indication may be received by the second apparatus.

In one configuration, the apparatus 1700 includes means for obtaining, from a second apparatus, a first indication associated with activation of a cell served by a second apparatus based on detected presence of a user equipment within the cell, and means for outputting, for transmission to the second apparatus, a second indication responsive to the first indication, the second indication being indicative of the activation of the cell. In one aspect, the aforementioned means may be the processor 1704 shown in FIG. 17 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1-3, 5, 6, 8-13, and 17, and utilizing, for example, the methods and/or algorithms described herein in relation to FIG. 18.

The methods shown in FIGS. 16 and 18 may include additional aspects, such as any single aspect or any combination of aspects described below and/or in connection with one or more other processes described elsewhere herein. The following provides an overview of several aspects of the present disclosure.

Aspect 1: A method for communication at a first apparatus (e.g., a method for communication at a first network entity), the method comprising: obtaining a first indication that is indicative of whether a user equipment is present within a coverage of a cell served by the first network entity; and outputting, for transmission to a second network entity, a second indication associated with activation of the cell, the outputting of the second indication being based on the first indication indicating that the user equipment is present within the coverage of the cell.

Aspect 2: The method of aspect 1, wherein the first apparatus does not have a connection with the user equipment.

Aspect 3: The method of any of aspects 1 through 2, wherein: the method further comprises determining, based on the first indication, that that the user equipment is present within the coverage of the cell; and the outputting of the second indication for transmission is based on the determining that the user equipment is present within the coverage of the cell.

Aspect 4: The method of any of aspects 1 through 3, wherein the first indication comprises a signal transmitted by the user equipment.

Aspect 5: The method of aspect 4, wherein the signal comprises a random access channel (RACH) preamble.

Aspect 6: The method of aspect 4, wherein the signal comprises connected mode signaling.

Aspect 7: The method of any of aspects 1 through 3, wherein the first indication comprises a signal transmitted to the user equipment.

Aspect 8: The method of any of aspects 1 through 3, wherein the first indication comprises a signal transmitted by a network entity.

Aspect 9: The method of any of aspects 1 through 8, wherein the obtaining the first indication comprises at least one of: sensing the user equipment; or using a sensor to sense the user equipment.

Aspect 10: The method of any of aspects 1 through 9, wherein the second indication indicates that the first apparatus activated the cell.

Aspect 11: The method of any of aspects 1 through 9, wherein the second indication comprises a request to activate the cell.

Aspect 12: The method of aspect 11, further comprising: obtaining, from the second apparatus, a response to the second indication, the response instructing the first apparatus to activate the cell.

Aspect 13: The method of any of aspects 1 through 9, wherein the second indication comprises a reference signal of the cell.

Aspect 14: The method of aspect 13, wherein the reference signal comprises a synchronization signal block (SSB) or a channel state information-reference signal (CSI-RS).

Aspect 15: The method of any of aspects 1 through 14, wherein the outputting of the second indication for transmission is based on a condition indicated by a measurement associated with the first indication.

Aspect 16: The method of aspect 15, wherein the measurement associated with the first indication comprises a reference signal received power (RSRP) measurement.

Aspect 17: The method of aspect 15, wherein the measurement associated with the first indication comprises a received signal strength indication (RSSI) measurement.

Aspect 18: The method of aspect 15, wherein the measurement associated with the first indication comprises at least one of: a signal-to-noise ratio (SNR) measurement, a signal-to-interference-and-noise ratio (SINR) measurement, a channel quality indication (CQI) measurement, a precoding matric indicator (PMI) measurement, a layer indicator (LI) measurement, a rank indicator (RI) measurement, or a reference signal received quality (RSRQ) measurement.

Aspect 19: The method of any of aspects 15 through 18, further comprising: obtaining an indication of the condition from the second apparatus.

Aspect 20: The method of any of aspects 1 through 19, further comprising: obtaining, from the second apparatus, information associated with reception of the first indication.

Aspect 21: The method of aspect 20, wherein the information indicates at least one of: a center frequency at which the first indication is to be received; or a bandwidth over which the first indication is to be received.

Aspect 22: The method of any of aspects 20 through 21, wherein the information indicates a time interval during which the first indication is to be received.

Aspect 23: The method of any of aspects 20 through 22, wherein the information indicates a spatial direction at which the first indication is to be received.

Aspect 24: The method of any of aspects 20 through 23, wherein the information indicates a coverage area within which the first indication is to be received.

Aspect 25: The method of any of aspects 20 through 24, wherein: the first indication comprises a random access channel (RACH) preamble; and the information comprises a RACH resource on which the first indication is to be received.

Aspect 26: The method of any of aspects 1 through 25, wherein the first indication comprises: a random access channel (RACH) preamble; and a RACH configuration associated with the first indication.

Aspect 27: The method of any of aspects 1 through 26, further comprising: receiving the first indication; and transmitting the second indication, wherein the first apparatus is configured as a network entity.

Aspect 28: A network entity, comprising: at least one transceiver; a memory comprising instructions; and one or more processors configured to execute the instructions and cause the network entity to perform a method in accordance with any one or more of aspects 1-26, wherein the at least one transceiver is configured to transmit the second indication.

Aspect 29: A first apparatus configured for communication comprising at least one means for performing any one or more of aspects 1 through 27.

Aspect 30: A non-transitory computer-readable medium storing computer-executable code, comprising code for causing a first apparatus to perform any one or more of aspects 1 through 27.

Aspect 31: A first apparatus, comprising: a memory comprising instructions; and one or more processors configured to execute the instructions and cause the first apparatus to perform a method in accordance with any one or more of aspects 1-26.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 5, 6, 8-13, 15, and 17 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network entity, comprising:
one or more transceivers; and
a processing system comprising one or more memories including instructions and one or more processors configured to execute the instructions to cause the first network entity to:
receive, from a second network entity and via the one or more transceivers, a message indicating that a first cell served by the first network entity is to be deactivated;
deactivate the first cell after the message is received, wherein the deactivation of the first cell configures the first cell to cease transmissions of any broadcast signaling;
receive, via the one or more transceivers and while the deactivated first cell is configured to cease transmissions of any broadcast signaling, a first indication that is indicative of whether a user equipment is present within a coverage area of the deactivated first cell, wherein a connection associated with the user equipment is not established via the first network entity when the first indication is received; and
transmit, via the one or more transceivers and based on the first indication indicating that the user equipment is present within the coverage area of the deactivated first cell, a second indication associated with activation of the deactivated first cell.

2. The first network entity of claim 1, wherein:
the processing system is further configured to execute the instructions to cause the first network entity to determine, based on the first indication, that the user equipment is present within the coverage area of the deactivated first cell; and
the transmission of the second indication is further based on the determination that the user equipment is present within the coverage area of the deactivated first cell.

3. The first network entity of claim 1, wherein the first indication comprises a obtained received, via the one or more transceivers, from the user equipment.

4. The first network entity of claim 3, wherein the signal comprises a random access channel (RACH) preamble.

5. The first network entity of claim 3, wherein the signal comprises connected mode signaling.

6. The first network entity of claim 1, wherein the first indication comprises a signal transmitted to the user equipment.

7. The first network entity of claim 1, wherein the first indication comprises a signal received, via the one or more transceivers, from a network entity.

8. The first network entity of claim 1, wherein, to receive the first indication, the processing system is further configured to execute the instructions to cause the first network entity to at least one of:
sense the user equipment; or
use a sensor to sense the user equipment.

9. The first network entity of claim 1, wherein the second indication indicates that the first network entity activated the deactivated first cell.

10. The first network entity of claim 1, wherein the second indication comprises a request to activate the deactivated first cell.

11. The first network entity of claim 10, wherein the processing system is further configured to execute the instructions to cause the first network entity to:
receive, from the second network entity and via the one or more transceivers, a response to the second indication, the response instructing the first network entity to activate the deactivated first cell.

12. The first network entity of claim 1, wherein the second indication comprises a reference signal of the first cell.

13. The first network entity of claim 12, wherein the reference signal comprises a synchronization signal block (SSB) or a channel state information-reference signal (CSI-RS).

14. The first network entity of claim 1, wherein the transmission of the second indication is further based on a condition indicated by a measurement associated with the first indication.

15. The first network entity of claim 14, wherein the measurement associated with the first indication comprises a reference signal received power (RSRP) measurement.

16. The first network entity of claim 14, wherein the measurement associated with the first indication comprises a received signal strength indication (RSSI) measurement.

17. The first network entity of claim 14, wherein the measurement associated with the first indication comprises at least one of: a signal-to-noise ratio (SNR) measurement, a signal-to-interference-and-noise ratio (SINR) measurement, a channel quality indication (CQI) measurement, a precoding matric indicator (PMI) measurement, a layer indicator (LI) measurement, a rank indicator (RI) measurement, or a reference signal received quality (RSRQ) measurement.

18. The first network entity of claim 14, wherein the processing system is further configured to execute the instructions to cause the first network entity to:

receive, via the one or more transceivers, an indication of the condition from the second network entity.

19. The first network entity of claim 1, wherein the processing system is further configured to execute the instructions to cause the first network entity to:

receive, from the second network entity and via the one or more transceivers, information associated with reception of the first indication.

20. The first network entity of claim 19, wherein the information indicates at least one of:

a center frequency at which the first indication is to be received; or a bandwidth over which the first indication is to be received.

21. The first network entity of claim 19, wherein the information indicates a time interval during which the first indication is to be received.

22. The first network entity of claim 19, wherein the information indicates a spatial direction at which the first indication is to be received.

23. The first network entity of claim 19, wherein the information indicates a coverage area within which the first indication is to be received.

24. The first network entity of claim 19, wherein:

the first indication comprises a random access channel (RACH) preamble; and the information comprises a RACH resource on which the first indication is to be received.

25. The first network entity of claim 1, wherein the first indication comprises:

a random access channel (RACH) preamble; and a RACH configuration associated with the first indication.

26. A method for communication by a first wireless node, the method comprising:

receiving, from a second wireless node, a message indicating that a first cell served by the first wireless node is to be deactivated;

deactivating the first cell after receiving the message, wherein the deactivating the first cell configures the first cell to cease transmissions of any broadcast signaling;

receiving, while the deactivated first cell is configured to cease transmissions of any broadcast signaling, a first indication that is indicative of whether a user equipment is present within a coverage area of the deactivated first cell, wherein a connection associated with the user equipment is not established via the first wireless node when the first indication is received; and transmitting a second indication associated with activation of the deactivated first cell, the transmitting the second indication being based on the first indication indicating that the user equipment is present within the coverage area of the deactivated first cell.

27. The first network entity of claim 1, wherein the message is associated with energy conservation-based cell deactivation.

* * * * *